United States Patent
Miyachi

(10) Patent No.: US 12,433,565 B2
(45) Date of Patent: Oct. 7, 2025

(54) ULTRASOUND DIAGNOSTIC APPARATUS AND CONTROL METHOD OF ULTRASOUND DIAGNOSTIC APPARATUS

(71) Applicant: FUJIFILM Corporation, Tokyo (JP)

(72) Inventor: Yukiya Miyachi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 683 days.

(21) Appl. No.: 16/945,617

(22) Filed: Jul. 31, 2020

(65) Prior Publication Data

US 2020/0359989 A1    Nov. 19, 2020

Related U.S. Application Data

(63) Continuation of application No. PCT/JP2019/003972, filed on Feb. 5, 2019.

(30) Foreign Application Priority Data

Mar. 28, 2018 (JP) .................. 2018-062249

(51) Int. Cl.
*A61B 8/06* (2006.01)
*A61B 8/00* (2006.01)
*A61B 8/08* (2006.01)

(52) U.S. Cl.
CPC .............. *A61B 8/06* (2013.01); *A61B 8/0891* (2013.01); *A61B 8/488* (2013.01); *A61B 8/5246* (2013.01); *A61B 8/54* (2013.01)

(58) Field of Classification Search
None
See application file for complete search history.

(56) References Cited

U.S. PATENT DOCUMENTS

| 4,509,526 A * | 4/1985 | Barnes .................... A61B 8/065 600/456 |
| 6,464,641 B1 * | 10/2002 | Pan .......................... A61B 8/13 600/453 |
| 2001/0016686 A1 | 8/2001 | Okada et al. |
| 2005/0203404 A1 * | 9/2005 | Freiburger ............ G01S 7/5208 600/453 |

(Continued)

FOREIGN PATENT DOCUMENTS

| EP | 0842638 A2 | 5/1998 |
| EP | 1152364 A2 | 11/2001 |

(Continued)

OTHER PUBLICATIONS

International Search Report issued in PCT/JP2019/003972; mailed Apr. 23, 2019.

(Continued)

*Primary Examiner* — Jonathan Cwern
(74) *Attorney, Agent, or Firm* — Studebaker Brackett PLLC

(57) ABSTRACT

An ultrasound diagnostic apparatus having: a display that displays a B-mode image in which at least a blood vessel region is imaged; and a processor configured to set a Doppler gate within the blood vessel region on the B-mode image; acquire a blood vessel gradient; and detect an anterior vascular wall and a posterior vascular wall by performing image analysis on the B-mode image, on an outer side of the Doppler gate in a direction perpendicular to the blood vessel gradient.

17 Claims, 17 Drawing Sheets

(56) References Cited

U.S. PATENT DOCUMENTS

2008/0249411 A1  10/2008  Kye et al.
2012/0310086 A1  12/2012  Fukumoto et al.
2014/0276072 A1   9/2014  Martins et al.
2015/0080729 A1   3/2015  Miyachi

FOREIGN PATENT DOCUMENTS

JP    H10216129  A    8/1998
JP    2001299752 A   10/2001
JP    2002052026 A    2/2002
JP    2002058672 A    2/2002
JP    2008253784 A   10/2008
JP       5844325 B2   1/2016
WO    2011099102 A1   8/2011

OTHER PUBLICATIONS

International Preliminary Report On Patentability and Written Opinion issued in PCT/JP2019/003972; issued Sep. 29, 2020.
The extended European search report issued by the European Patent Office on Apr. 8, 2021, which corresponds to European Patent Application No. 19775924.4-1126 and is related to U.S. Appl. No. 16/945,617.
The extended European search report issued by the European Patent Office on Aug. 3, 2023, which corresponds to European Patent Application No. 23184159.4-1126 and is related to U.S. Appl. No. 16/945,617.

\* cited by examiner

ULTRASOUND DIAGNOSTIC APPARATUS AND CONTROL METHOD OF ULTRASOUND DIAGNOSTIC APPARATUS

CROSS-REFERENCE TO RELATED APPLICATIONS

This application is a Continuation of PCT International Application No. PCT/JP2019/003972 filed on Feb. 5, 2019, which claims priority under 35 U.S.C § 119(a) to Japanese Patent Application No. 2018-062249 filed on Mar. 28, 2018. Each of the above applications is hereby expressly incorporated by reference, in its entirety, into the present application.

BACKGROUND OF THE INVENTION

1. Field of the Invention

The invention relates to an ultrasound diagnostic apparatus and a control method of the ultrasound diagnostic apparatus, and particularly to an ultrasound diagnostic apparatus and a control method of the ultrasound diagnostic apparatus which detect a vascular wall in a B-mode image.

2. Description of the Related Art

In the related art, an ultrasound diagnostic apparatus has been known as an apparatus for obtaining an image of the inside of a subject. The ultrasound diagnostic apparatus generally comprises an ultrasound probe comprising a transducer array in which a plurality of elements are arranged. In a state where the ultrasound probe is in contact with a body surface of the subject, an ultrasound beam is transmitted toward the subject from the transducer array and an ultrasound echo from the subject is received by the transducer array so that element data is acquired. Further, the ultrasound diagnostic apparatus electrically processes the obtained element data to generate an ultrasound image of the corresponding site of the subject.

For example, JP2002-052026A discloses an ultrasound diagnostic apparatus which installs a Doppler gate on the B-mode image, sets a circular search region centered on a center point of the Doppler gate, and searches for B-mode intensity data outwards from the center along radial lines over an entire 360° range of the search region to detect a vascular wall.

SUMMARY OF THE INVENTION

With the ultrasound diagnostic apparatus in JP2002-052026A, it is possible to adjust the position and size of the Doppler gate on the basis of the detected vascular wall and to select an optimal steering angle.

However, on the B-mode image, the maximum point of the B-mode intensity due to the multiple reflection may appear in the vicinity of the vascular wall, and for example, in a case where a maximum point M of the B-mode intensity is positioned between an anterior vascular wall W1 and a posterior vascular wall W2 as illustrated in FIG. 23, the maximum point may be erroneously detected as the vascular wall.

The invention has been made in order to solve such a problem in the related art, and an object of the invention is to provide an ultrasound diagnostic apparatus and a control method of the ultrasound diagnostic apparatus which can accurately detect a vascular wall.

In order to achieve the object, an ultrasound diagnostic apparatus according to an aspect of the invention comprises a display unit that displays a B-mode image in which at least a blood vessel region is imaged; a gate setting unit that sets a Doppler gate within the blood vessel region on the B-mode image; a blood vessel gradient acquisition unit that acquires a blood vessel gradient; and a vascular wall detection unit that detects an anterior vascular wall and a posterior vascular wall by performing image analysis on an outer side of the Doppler gate set by the gate setting unit in a direction perpendicular to the blood vessel gradient acquired by the blood vessel gradient acquisition unit, on the B-mode image.

It is preferable that the Doppler gate has an upper gate point and a lower gate point which face each other along a scan line passing through a center point of the Doppler gate, and the vascular wall detection unit has an anterior wall detection unit that detects the anterior vascular wall in a shallow portion direction from an upper projection point obtained by projecting the upper gate point on a blood flow perpendicular line that passes through the center point of the Doppler gate and extends perpendicular to the blood vessel gradient, and a posterior wall detection unit that detects the posterior vascular wall in a deep portion direction from a lower projection point obtained by projecting the lower gate point on the blood flow perpendicular line.

In this case, the anterior wall detection unit may be configured to detect the anterior vascular wall in a range from the upper projection point to a point positioned in the shallow portion direction apart from the upper projection point by a predetermined distance along the blood flow perpendicular line, and the posterior wall detection unit may be configured to detect the posterior vascular wall in a range from the lower projection point to a point positioned in the deep portion direction apart from the lower projection point by the predetermined distance along the blood flow perpendicular line.

Alternatively, the anterior wall detection unit may be configured to set an upper detection region having a predetermined range which extends in the shallow portion direction from the upper projection point along the blood flow perpendicular line and extends parallel to the blood vessel gradient, detect an anterior vascular wall boundary line within the upper detection region, and detect an intersection between the blood flow perpendicular line and the detected anterior vascular wall boundary line as the anterior vascular wall, and the posterior wall detection unit may be configured to set a lower detection region having a predetermined range which extends in the deep portion direction from the lower projection point along the blood flow perpendicular line and extends parallel to the blood vessel gradient, detect a posterior vascular wall boundary line within the lower detection region, and detect an intersection between the blood flow perpendicular line and the detected posterior vascular wall boundary line as the posterior vascular wall.

Further, the vascular wall detection unit may include an image rotation unit that rotates the B-mode image by the blood vessel gradient acquired by the blood vessel gradient acquisition unit such that the blood vessel region extends horizontally, and the anterior wall detection unit and the posterior wall detection unit may respectively detect the anterior vascular wall and the posterior vascular wall on the B-mode image rotated by the image rotation unit.

In this case, it is preferable that the vascular wall detection unit includes a smoothing unit that performs smoothing processing along a horizontal direction on the B-mode image rotated by the image rotation unit, and the anterior wall detection unit and the posterior wall detection unit respectively detect the anterior vascular wall and the posterior vascular wall on the B-mode image smoothed by the smoothing unit.

A cross-sectional area calculation unit may be further provided which calculates a cross-sectional area of a blood vessel on the basis of the anterior vascular wall and the posterior vascular wall detected by the vascular wall detection unit.

There are further provided a Doppler processing unit that calculates a blood flow velocity on the basis of Doppler data in the Doppler gate; and a blood flow volume measurement unit that measures a blood flow volume on the basis of the cross-sectional area of the blood vessel calculated by the cross-sectional area calculation unit and the blood flow velocity calculated by the Doppler processing unit, and displays a measurement result on the display unit.

It is preferable that an average blood flow velocity calculation unit that calculates an average blood flow velocity for one heartbeat period on the basis of the blood flow velocity calculated by the Doppler processing unit is further provided, and the blood flow volume measurement unit measures a blood flow volume on the basis of the cross-sectional area of the blood vessel calculated by the cross-sectional area calculation unit and the average blood flow velocity calculated by the average blood flow velocity calculation unit.

The Doppler processing unit may generate a Doppler waveform image on the basis of the Doppler data in the Doppler gate, and the display unit may display the B-mode image and the Doppler waveform image.

The blood vessel gradient acquisition unit may acquire the blood vessel gradient on the basis of a cursor steering angle which is an inclination angle of a scan line passing through a center point of the Doppler gate, and a blood flow correction angle which represents an inclination angle of the blood vessel region with respect to the scan line passing through the center point of the Doppler gate. Alternatively, the blood vessel gradient acquisition unit may include a blood flow correction angle detection unit that recognizes the blood vessel region to detect a blood flow correction angle by performing image analysis on the B-mode image, and calculate the blood vessel gradient using the blood flow correction angle detected by the blood flow correction angle detection unit.

A control method of an ultrasound diagnostic apparatus according to another aspect of the invention comprises displaying a B-mode image in which at least a blood vessel region is imaged; setting a Doppler gate within the blood vessel region on the B-mode image; acquiring a blood vessel gradient; and detecting an anterior vascular wall and a posterior vascular wall by performing image analysis on an outer side of the Doppler gate in a direction perpendicular to the acquired blood vessel gradient, on the B-mode image.

According to the invention, since there are provided a gate setting unit that sets a Doppler gate within the blood vessel region on the B-mode image; a blood vessel gradient acquisition unit that acquires a blood vessel gradient; and a vascular wall detection unit that detects an anterior vascular wall and a posterior vascular wall by performing image analysis on an outer side of the Doppler gate set by the gate setting unit in a direction perpendicular to the blood vessel gradient, on the B-mode image, it is possible to accurately detect a vascular wall.

DESCRIPTION OF THE PREFERRED EMBODIMENTS

Hereinafter, embodiments of the invention will be described with reference to the accompanying drawings.

The description of constituents described below is given based on the representative embodiment of the invention, but the invention is not limited to such an embodiment.

In the present specification, a numerical range represented using "to" means a range including the numerical values before and after "to" as a lower limit value and an upper limit value.

In addition, in the present specification, the terms "perpendicular" and "parallel" include a range of error allowed in the technical field to which the invention belongs. For example, the terms "perpendicular" and "parallel" mean a range less than ±10° with respect to the strict perpendicular or parallel, and the error with respect to the strict perpendicular or parallel is preferably 5° or less, and more preferably 3° or less.

In the present specification, the terms "same" and "identical" include an error range generally allowed in the technical field. Further, in the present specification, in a case of referring to "all", "any", or "whole surface", the term includes an error range generally allowed in the technical field in addition to a case of 100%, and includes, for example, a case of 99% or more, a case of 95% or more, or a case of 90% or more.

First Embodiment

Figure 1:
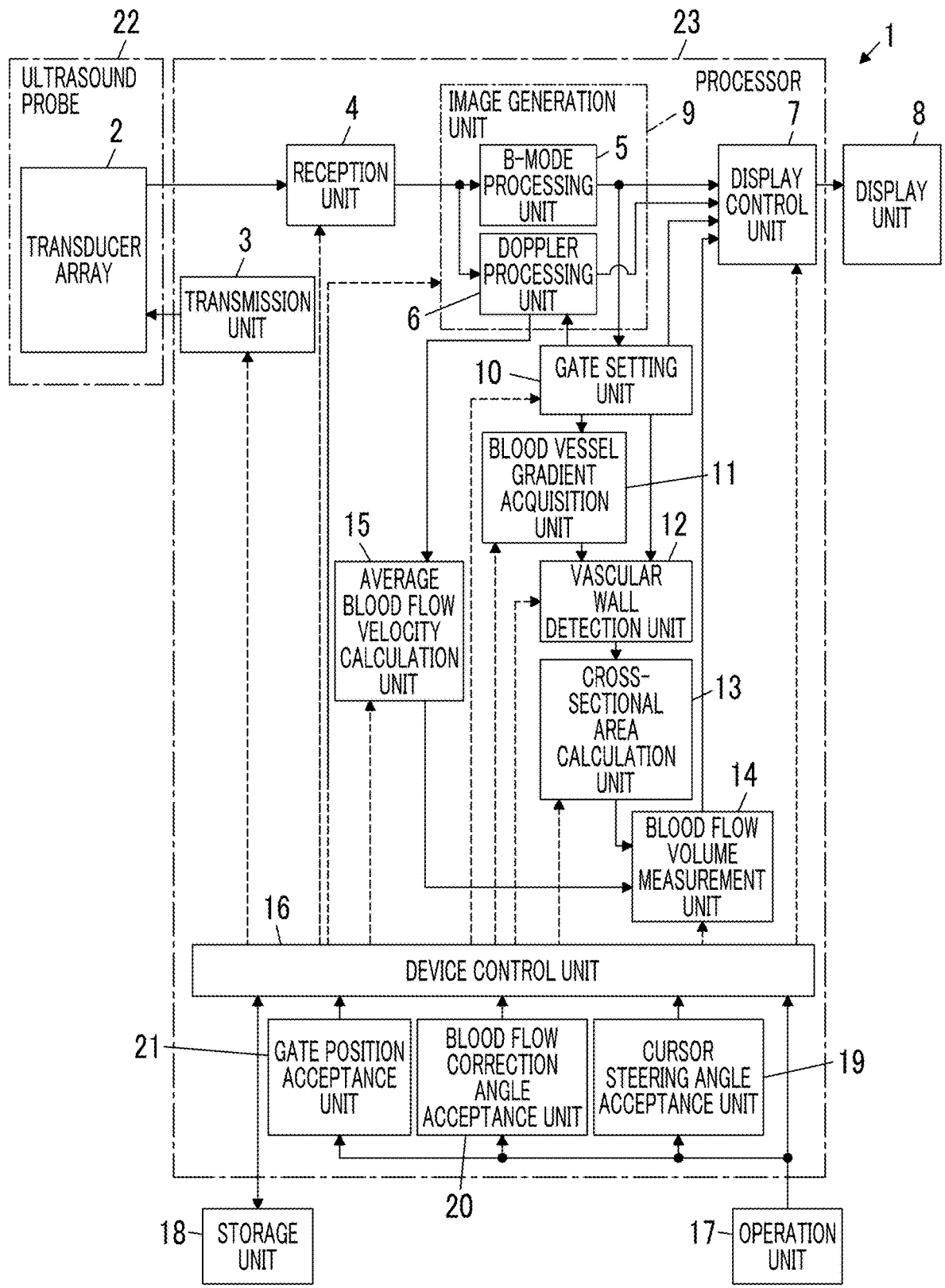
FIG. 1 is a block diagram illustrating a configuration of an ultrasound diagnostic apparatus according to a first embodiment of the invention.

FIG. 1 illustrates a configuration of an ultrasound diagnostic apparatus 1 according to a first embodiment of the invention. As illustrated in FIG. 1, the ultrasound diagnostic apparatus 1 comprises a transducer array 2, and each of a transmission unit 3 and a reception unit 4 is connected to the transducer array 2. A B-mode processing unit 5 and a Doppler processing unit 6 are connected in parallel to the reception unit 4, and a display unit 8 is connected to the B-mode processing unit 5 and the Doppler processing unit 6 via a display control unit 7. The B-mode processing unit 5 and the Doppler processing unit 6 constitute an image generation unit 9.

A gate setting unit 10 is connected to the B-mode processing unit 5, and a blood vessel gradient acquisition unit 11 is connected to the gate setting unit 10. In addition, a vascular wall detection unit 12 is connected to each of the gate setting unit 10 and the blood vessel gradient acquisition unit 11, and a cross-sectional area calculation unit 13 and a blood flow volume measurement unit 14 are sequentially connected in series to the vascular wall detection unit 12. Further, an average blood flow velocity calculation unit 15 is connected to the Doppler processing unit 6, and the blood flow volume measurement unit 14 is connected to the average blood flow velocity calculation unit 15. The gate setting unit 10 is also connected to the Doppler processing unit 6, and the gate setting unit 10 and the blood flow volume measurement unit 14 are connected to the display control unit 7.

In addition, a device control unit 16 is connected to the transmission unit 3, the reception unit 4, the display control unit 7, the image generation unit 9, the gate setting unit 10, the blood vessel gradient acquisition unit 11, the vascular wall detection unit 12, the cross-sectional area calculation unit 13, the blood flow volume measurement unit 14, and the average blood flow velocity calculation unit 15, and an operation unit 17 and a storage unit 18 are connected to the device control unit 16. Further, a cursor steering angle acceptance unit 19, a blood flow correction angle acceptance unit 20, and a gate position acceptance unit 21 are connected to the operation unit 17, and the cursor steering angle acceptance unit 19, the blood flow correction angle acceptance unit 20, and the gate position acceptance unit 21 are connected to the device control unit 16. The device control unit 16 and the storage unit 18 are connected so as to exchange information bidirectionally.

Further, the transducer array 2 is included in an ultrasound probe 22, and the transmission unit 3, the reception unit 4, the display control unit 7, the image generation unit 9, the gate setting unit 10, the blood vessel gradient acquisition unit 11, the vascular wall detection unit 12, the cross-sectional area calculation unit 13, the blood flow volume measurement unit 14, the average blood flow velocity calculation unit 15, the device control unit 16, the cursor steering angle acceptance unit 19, the blood flow correction angle acceptance unit 20, and the gate position acceptance unit 21 constitute a processor 23.

The transducer array 2 of the ultrasound probe 22 illustrated in FIG. 1 has a plurality of transducers arranged in a one-dimensional or two-dimensional manner. According to a drive signal supplied from the transmission unit 3, each of the transducers transmits an ultrasonic wave and receives an ultrasound echo from a subject to output a signal based on the ultrasound echo. For example, each transducer is configured by forming electrodes at both ends of a piezoelectric body consisting of piezoelectric ceramic represented by lead zirconate titanate (PZT), a polymer piezoelectric element represented by poly vinylidene di fluoride (PVDF), piezoelectric single crystal represented by lead magnesium niobate-lead titanate (PMN-PT), or the like.

The transmission unit 3 of the processor 23 includes, for example, a plurality of pulse generators, and the transmission unit 3 adjusts the amount of delay of each drive signal so that ultrasonic waves transmitted from the plurality of transducers of the transducer array 2 form an ultrasound beam on the basis of a transmission delay pattern selected according to the control signal from the device control unit 16, and supplies the obtained signals to the plurality of transducers. Thus, in a case where a pulsed or continuous-wave voltage is applied to the electrodes of the transducers of the transducer array 2, the piezoelectric body expands and contracts to generate pulsed or continuous-wave ultrasonic waves from each transducer. From the combined wave of these ultrasonic waves, an ultrasound beam is formed.

The transmitted ultrasound beam is reflected by a target, for example, a site of the subject, and propagates toward the transducer array 2 of the ultrasound probe 22. The ultrasonic waves propagating toward the transducer array 2 in this manner are received by each transducer constituting the transducer array 2. In this case, each transducer constituting the transducer array 2 expands and contracts by receiving the propagating ultrasound echo to generate electrical signals, and outputs the electrical signals to the reception unit 4.

Figure 2:
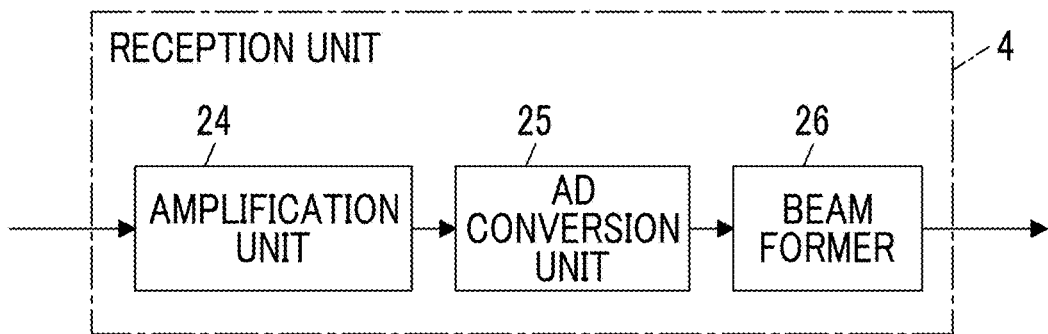
FIG. 2 is a block diagram illustrating an internal configuration of a reception unit in the first embodiment of the invention.

The reception unit 4 of the processor 23 processes the signals output from the transducer array 2 according to the control signals from the device control unit 16. As illustrated in FIG. 2, the reception unit 4 has a configuration in which an amplification unit 24, an analog digital (AD) conversion unit 25, and a beam former 26 are connected in series.

The amplification unit 24 amplifies the signals input from each transducer constituting the transducer array 2, and transmits the amplified signals to the AD conversion unit 25. The AD conversion unit 25 converts the signals transmitted from the amplification unit 24 into digital data, and transmits the data to the beam former 26. The beam former 26 performs so-called reception focusing processing in which addition is performed by giving delays to respective pieces of data converted by the AD conversion unit 25 according to a sound speed distribution or a sound speed set on the basis of a reception delay pattern selected according to the control signals from the device control unit 16. Through the reception focusing processing, a reception signal in which each piece of data converted by the AD conversion unit 25 is phased and added and the focus of the ultrasound echo is narrowed is acquired.

Figure 3:
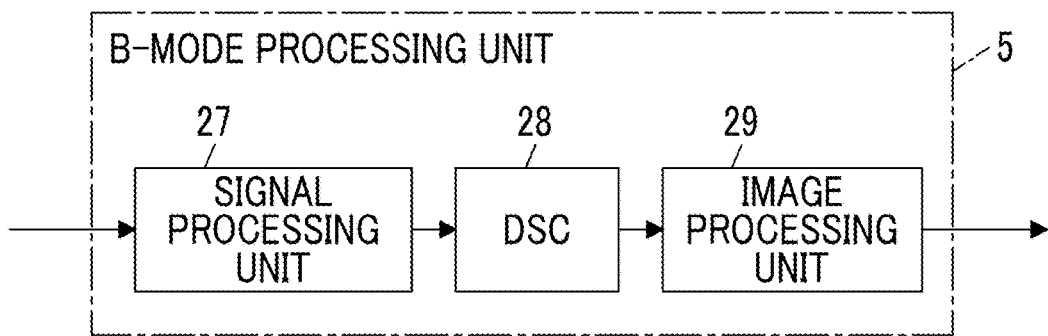
FIG. 3 is a block diagram illustrating an internal configuration of a B-mode processing unit in the first embodiment of the invention.

As illustrated in FIG. 3, the B-mode processing unit 5 of the image generation unit 9 has a configuration in which a signal processing unit 27, a digital scan converter (DSC) 28, and an image processing unit 29 are sequentially connected in series.

The signal processing unit 27 generates a B-mode image signal, which is tomographic image information regarding tissues inside the subject, by performing, on reception data generated by the reception unit 4, correction of the attenuation due to the distance according to the depth of the reflection position of the ultrasonic wave and then performing envelope detection processing.

The DSC 28 converts (raster conversion) the B-mode image signal generated by the signal processing unit 27 into an image signal according to a normal television signal scanning method.

The image processing unit 29 performs various kinds of necessary image processing such as gradation processing on the B-mode image signal input from the DSC 28, and then outputs the B-mode image signal to the display control unit 7.

Figure 4:
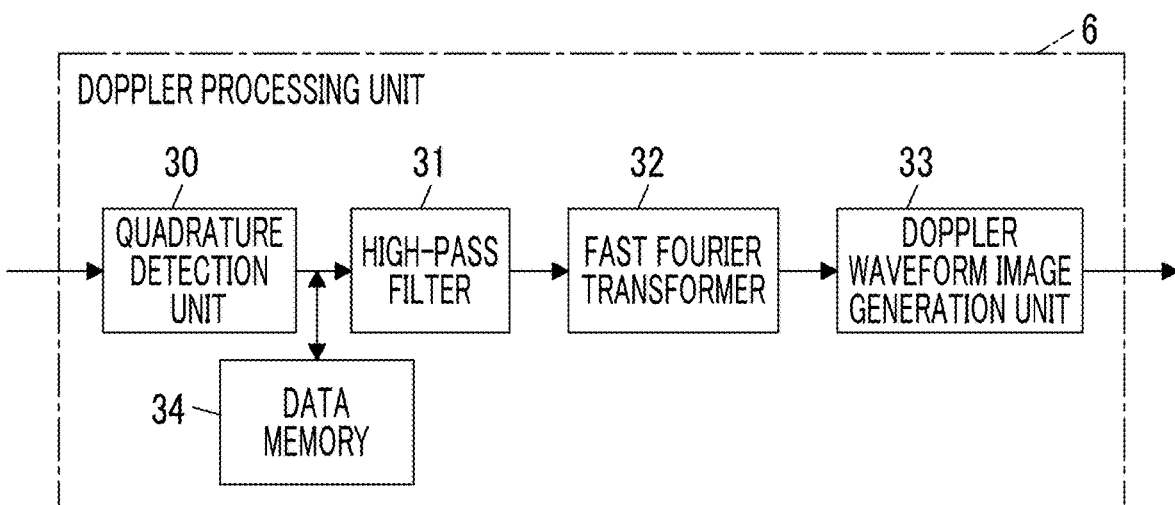
FIG. 4 is a block diagram illustrating an internal configuration of a Doppler processing unit in the first embodiment of the invention.

The Doppler processing unit 6 of the image generation unit 9 calculates the blood flow velocity using a so-called pulse Doppler method and generates a Doppler waveform image. As illustrated in FIG. 4, the Doppler processing unit 6 has a configuration in which a quadrature detection unit 30, a high-pass filter 31, a fast Fourier transformer 32, and a Doppler waveform image generation unit 33 are sequentially connected in series and a data memory 34 is connected to an output terminal of the quadrature detection unit 30.

The quadrature detection unit 30 mixes the reception data generated by the reception unit 4 with a carrier signal having a reference frequency to perform quadrature detection on the reception data and converts the reception data into complex data.

The high-pass filter 31 functions as a so-called wall filter, and removes a frequency component derived from the motion of the body tissue inside the subject, from the complex data generated by the quadrature detection unit 30.

The fast Fourier transformer 32 performs a Fourier transform on the complex data of a plurality of sample points to perform frequency analysis, obtains the blood flow velocity, and generates a spectrum signal.

The Doppler waveform image generation unit 33 generates a Doppler waveform image by aligning the spectrum signals generated by the fast Fourier transformer 32 on a time axis and expressing the magnitude of each frequency component in brightness. In the Doppler waveform image, the lateral axis indicates a time axis, the vertical axis indicates a Doppler shift frequency, that is, a flow velocity, and the brightness of the waveform represents power in each frequency component.

Further, the data memory 34 preserves the complex data converted from the reception data by the quadrature detection unit 30.

Figure 5:
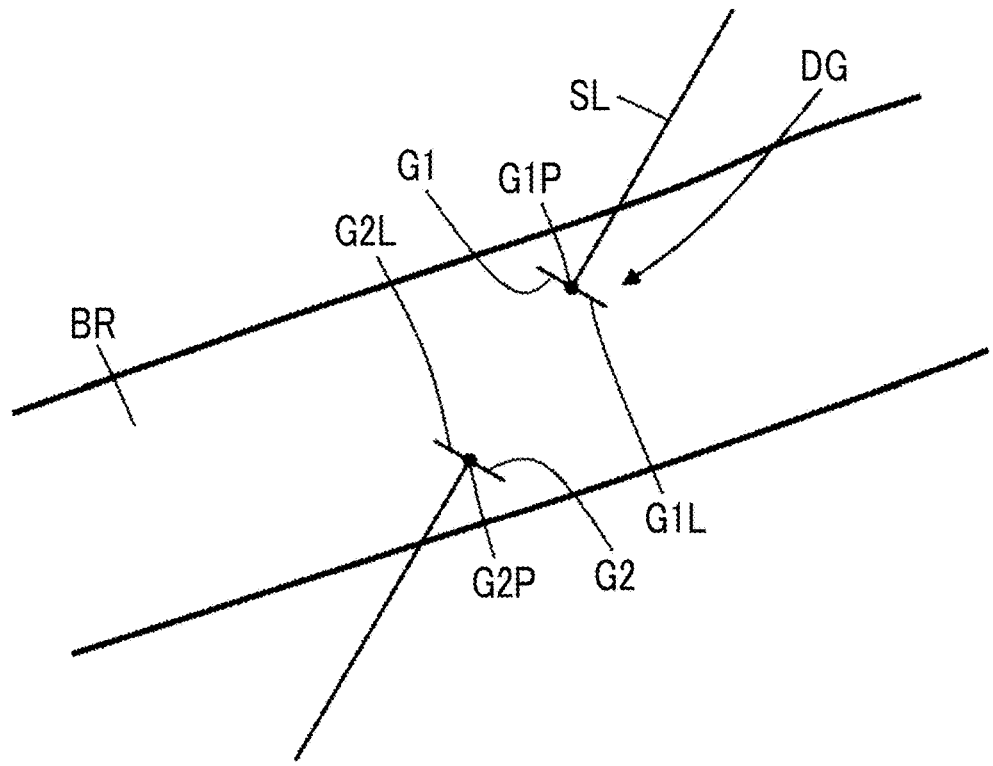
FIG. 5 is a diagram schematically illustrating a Doppler gate set by a gate setting unit in the first embodiment of the invention.

The gate setting unit 10 of the processor 23 sets a Doppler gate within a blood vessel region on the B-mode image on the basis of a cursor steering angle accepted by the cursor steering angle acceptance unit 19 and a gate position accepted by the gate position acceptance unit 21. As illustrated in FIG. 5, a Doppler gate DG has an upper gate part G1 and a lower gate part G2 disposed to be movable along a scan line SL having a cursor steering angle accepted by the cursor steering angle acceptance unit 19. The upper gate part G1 is formed by an upper gate point G1P positioned on the scan line SL and a line segment G1L which passes through the upper gate point G1P and is perpendicular to the scan line SL, and the lower gate part G2 is formed by a lower gate point G2P positioned on the scan line SL and a line segment G2L which passes through the lower gate point G2P and is perpendicular to the scan line SL. The Doppler gate DG is set such that the upper gate point G1P and the lower gate point G2P are positioned inside a blood vessel region BR by, for example, about 1 to 2 mm from the contour of the blood vessel region BR on the B-mode image.

The line segment G1LL of the upper gate part G1 and the line segment G2L of the lower gate part G2 are for making the Doppler gate DG easy to see, and may be line segments which are not perpendicular to the scan line SL and extend parallel to a horizontal direction of a screen of the display unit 8. The gate position accepted by the gate position acceptance unit 21 can include the position of each of the upper gate part G1 and the lower gate part G2.

The gate setting unit 10 has, for example, an initially set Doppler gate, and can set the Doppler gate DG according to the user's operation by forming the Doppler gate initially set on the scan line SL having the cursor steering angle and moving the positions of the upper gate part G1 and the lower gate part G2 of the initially set Doppler gate according to the gate position accepted by the gate position acceptance unit 21.

The Doppler processing unit 6 of the image generation unit 9 calculates the blood flow velocity on the basis of the Doppler data in the Doppler gate DG set by the gate setting unit 10, that is, in a region interposed between the upper gate part G1 and the lower gate part G2 to generate a Doppler waveform image.

Figure 6:
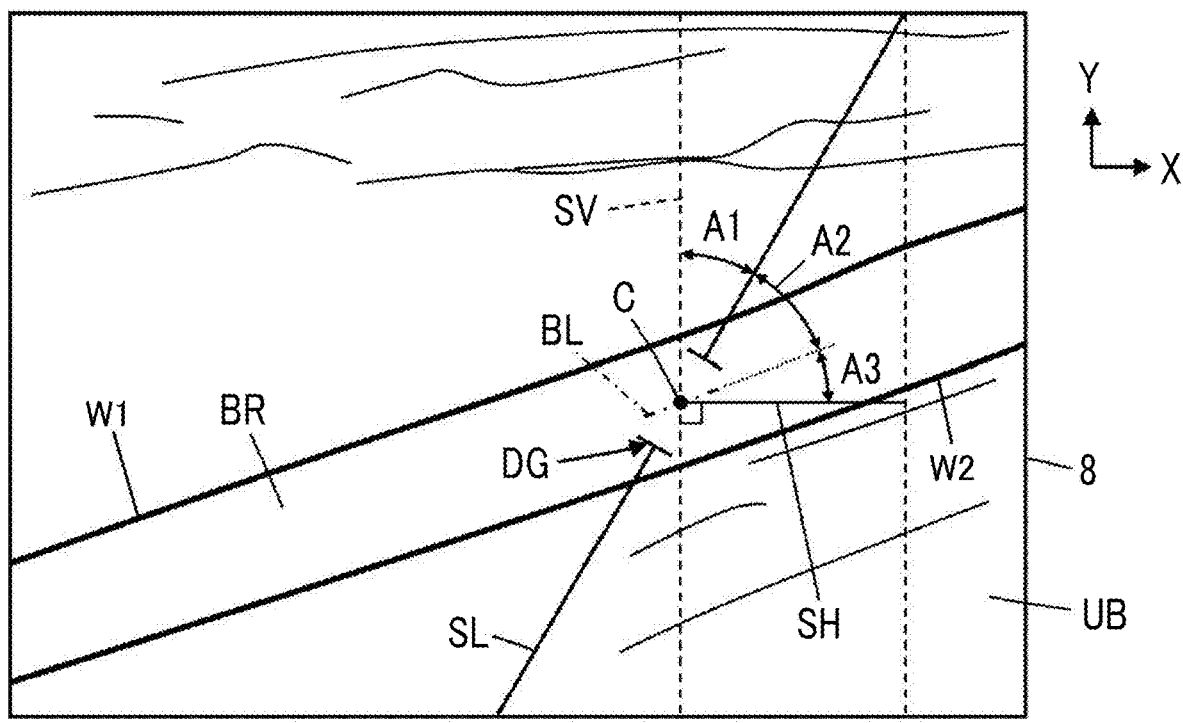
FIG. 6 is a diagram schematically illustrating a method of acquiring a blood vessel gradient by a blood vessel gradient acquisition unit in the first embodiment of the invention.

The blood vessel gradient acquisition unit 11 of the processor 23 acquires the blood vessel gradient on the basis of the cursor steering angle accepted by the cursor steering angle acceptance unit 19 and a blood flow correction angle accepted by the blood flow correction angle acceptance unit 20. Here, an example of the screen of the display unit 8 is illustrated in FIG. 6. For convenience, in the screen of the display unit 8, a direction extending horizontally is set as an X direction, and a direction extending vertically is set as a Y direction. A cursor steering angle A1 represents an inclination angle of the scan line SL passing through a center point C of the Doppler gate DG with respect to a vertical line SV on the screen of the display unit 8, that is, the Y direction. A blood flow correction angle A2 represents an inclination angle of the blood vessel region BR with respect to the scan line SL passing through the center point C of the Doppler gate DG, and a blood flow correction angle line BL passing through the center point C of the Doppler gate DG is illustrated on the basis of the blood flow correction angle A2 accepted by the blood flow correction angle acceptance unit 20. The blood flow correction angle A2 is an angle between the scan line SL and the blood flow correction angle line BL. A blood vessel gradient A3 represents an angle of the blood flow correction angle line BL with respect to a horizontal line SH on the screen of the display unit 8, that is, the X direction, and is referred to as a blood vessel angle.

The vascular wall detection unit 12 of the processor 23 detects an anterior vascular wall and a posterior vascular wall by performing image analysis on the B-mode image.

Here, an upper vascular wall of the vascular walls on the B-mode image, that is, a vascular wall on a shallow portion side which is close to the body surface of the subject with which the ultrasound probe 22 is in contact is called the anterior vascular wall, and a lower vascular wall of the vascular walls on the B-mode image, that is, a vascular wall on a deep portion side which is far from the body surface with which the ultrasound probe 22 is in contact with is called the posterior vascular wall. For example, in the screen of the display unit 8 illustrated in FIG. 6, of the vascular walls as the boundary of the blood vessel region BR on a B-mode image UB, an anterior vascular wall W1 is positioned on the upper side, that is, +Y direction side, and a posterior vascular wall W2 is positioned on the lower side, that is, −Y direction side.

Even in a case where the maximum point of the B-mode intensity due to multiple reflection appears in the vicinity of the anterior vascular wall W1 and the posterior vascular wall W2, the vascular wall detection unit 12 searches and detects the anterior vascular wall W1 and the posterior vascular wall W2 on the outer side of the Doppler gate DG in a direction perpendicular to the blood vessel gradient A3 so as not to erroneously detect the maximum point as the anterior vascular wall W1 and the posterior vascular wall W2.

Figure 7:
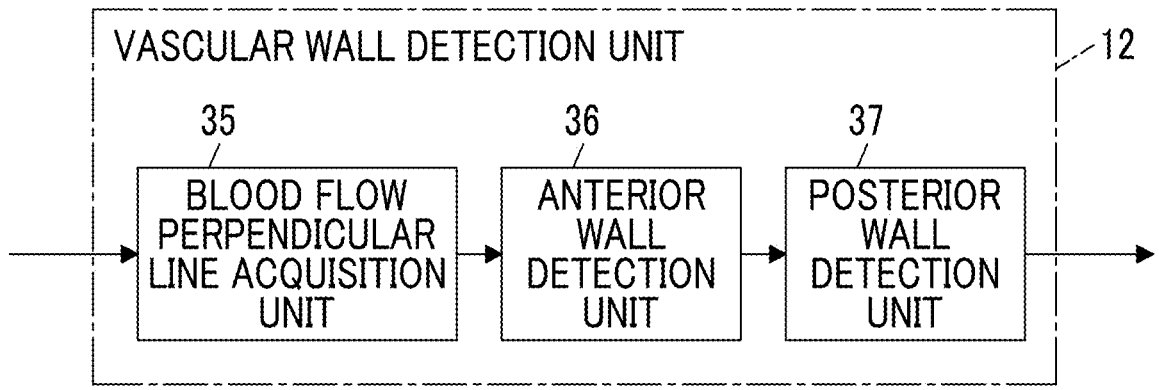
FIG. 7 is a block diagram illustrating an internal configuration of a vascular wall detection unit in the first embodiment of the invention.

As illustrated in FIG. 7, the vascular wall detection unit 12 has a configuration in which a blood flow perpendicular line acquisition unit 35, an anterior wall detection unit 36, and a posterior wall detection unit 37 are connected in series.

Figure 8:
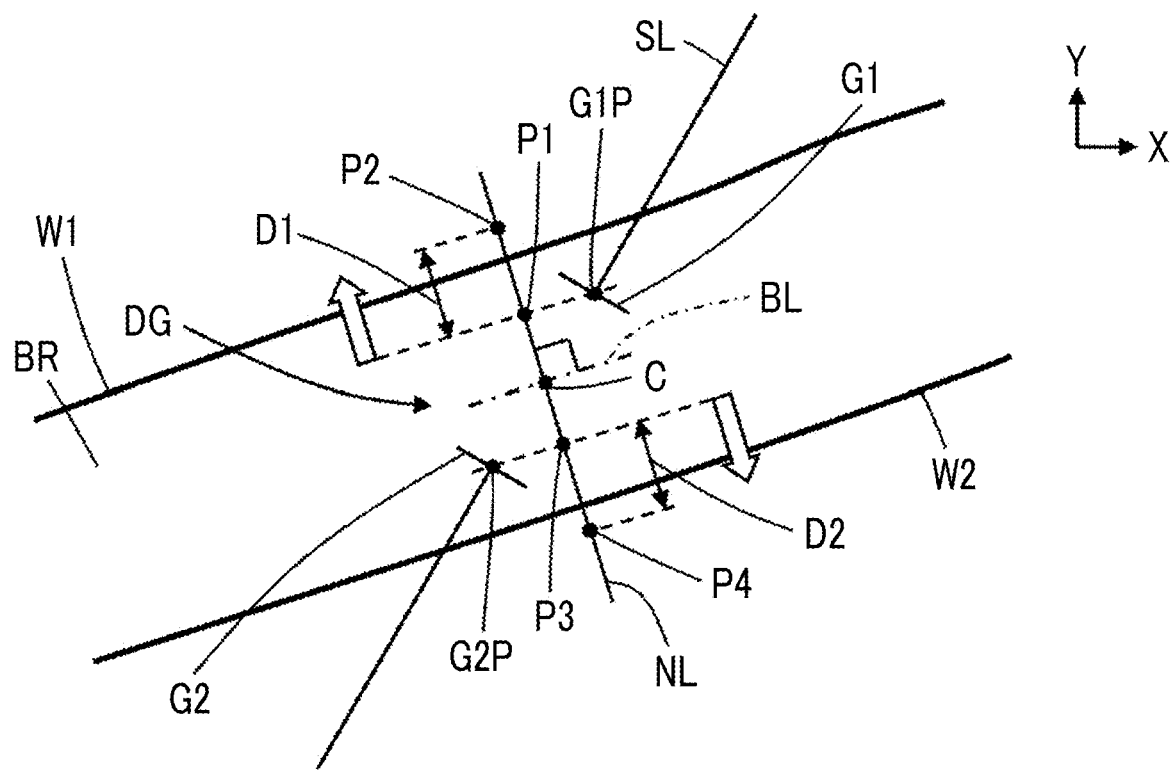
FIG. 8 is a diagram schematically illustrating a method of detecting a vascular wall by the vascular wall detection unit in the first embodiment of the invention.

As illustrated in FIG. 8, the blood flow perpendicular line acquisition unit 35 calculates and acquires a blood flow perpendicular line NL which passes through the center point C of the Doppler gate DG and extends perpendicular to the blood flow correction angle line BL.

The anterior wall detection unit 36 detects the anterior vascular wall W1 by performing image analysis in a range from an upper projection point P1, which is obtained by projecting the upper gate point G1P of the Doppler gate DG on the blood flow perpendicular line NL, to a point P2 positioned in a shallow portion direction apart from the upper projection point P1 by a predetermined distance D1 along the blood flow perpendicular line NL. The posterior wall detection unit 37 detects the posterior vascular wall W2 by performing image analysis in a range from a lower projection point P3, which is obtained by projecting the lower gate point G2P of the Doppler gate DG on the blood flow perpendicular line NL, to a point P4 positioned in a deep portion direction apart from the lower projection point P3 by a predetermined distance D2 along the blood flow perpendicular line NL. Here, the distances D1 and D2 may have the same value as each other or different values from each other. Since the upper gate point G1P and the lower gate point G2P are set to be positioned inside the blood vessel region BR by, for example, about 1 to 2 mm from the contour of the blood vessel region BR on the B-mode image, it is preferable that the distances D1 and D2 are set to be about 3 to 5 mm.

Further, each of the distances D1 and D2 can be set to have a predetermined ratio with respect to a gate width defined by the distance between the upper gate point G1P and the lower gate point G2P of the Doppler gate DG.

The anterior wall detection unit 36 and the posterior wall detection unit 37 can detect the anterior vascular wall W1 and the posterior vascular wall W2 on the basis of the intensity (brightness) of the B-mode image signal at each point on the blood flow perpendicular line NL or on the basis of the amount of change in intensity of the B-mode image signal at each point on the blood flow perpendicular line NL.

The cross-sectional area calculation unit 13 of the processor 23 calculates the blood vessel diameter from the positions of the anterior vascular wall W1 and the posterior vascular wall W2 on the blood flow perpendicular line NL detected by the vascular wall detection unit 12, and calculates a cross-sectional area of the blood vessel from the blood vessel diameter assuming that the blood vessel has a circular cross section.

The average blood flow velocity calculation unit 15 of the processor 23 calculates an average blood flow velocity for one heartbeat period on the basis of the blood flow velocity calculated by the Doppler processing unit 6.

The blood flow volume measurement unit 14 of the processor 23 measures a blood flow volume representing the volume of the blood flowing in the blood vessel per unit time on the basis of the cross-sectional area of the blood vessel calculated by the cross-sectional area calculation unit 13 and the average blood flow velocity calculated by the average blood flow velocity calculation unit 15.

Information on the Doppler gate DG set by the gate setting unit 10 and the blood flow volume measured by the blood flow volume measurement unit 14 is sent to the display unit 8 via the display control unit 7 and is displayed on the display unit 8.

The cursor steering angle acceptance unit 19 of the processor 23 accepts the cursor steering angle A1 selected by the user through the operation unit 17.

The blood flow correction angle acceptance unit 20 of the processor 23 accepts the blood flow correction angle A2 set by the user through the operation unit 17.

The gate position acceptance unit 21 of the processor 23 accepts the position of each of the upper gate part G1 and the lower gate part G2 of the Doppler gate DG set by the user through the operation unit 17.

The device control unit 16 of the processor 23 controls each unit of the ultrasound diagnostic apparatus 1 on the basis of a program stored in advance in the storage unit 18 or the like and the user's operation through the operation unit 17.

The display control unit 7 of the processor 23 performs predetermined processing on the ultrasound image generated by the image generation unit 9 and generates an image displayable on the display unit 8, under the control of the device control unit 16.

The display unit 8 displays the image generated by the display control unit 7, and includes, for example, a display device such as a liquid crystal display (LCD).

The operation unit 17 is for the user to perform an input operation, and can be configured to comprise a keyboard, a mouse, a trackball, a touchpad, a touch panel, and the like.

The storage unit 18 stores an operation program and the like of the ultrasound diagnostic apparatus 1, and recording media such as a hard disc drive (HDD), a solid state drive (SSD), a flexible disc (FD), a magneto-optical disc (MO disc), a magnetic tape (MT), a random access memory (RAM), a compact disc (CD), a digital versatile disc (DVD), a secure digital card (SD card), and a universal serial bus memory (USB memory), or a server can be used.

The processor 23 having the transmission unit 3, the reception unit 4, the display control unit 7, the image generation unit 9, the gate setting unit 10, the blood vessel gradient acquisition unit 11, the vascular wall detection unit 12, the cross-sectional area calculation unit 13, the blood flow volume measurement unit 14, the average blood flow velocity calculation unit 15, the device control unit 16, the cursor steering angle acceptance unit 19, the blood flow correction angle acceptance unit 20, and the gate position acceptance unit 21 is configured by a central processing unit (CPU) and a control program causing the CPU to execute various kinds of processing, but may be configured using a digital circuit. In addition, the transmission unit 3, the reception unit 4, the display control unit 7, the image generation unit 9, the gate setting unit 10, the blood vessel gradient acquisition unit 11, the vascular wall detection unit 12, the cross-sectional area calculation unit 13, the blood flow volume measurement unit 14, the average blood flow velocity calculation unit 15, the device control unit 16, the cursor steering angle acceptance unit 19, the blood flow correction angle acceptance unit 20, and the gate position acceptance unit 21 can also be configured by being integrated partially or entirely into one CPU.

Next, the operation of the ultrasound diagnostic apparatus 1 in the first embodiment will be described in detail using the flowchart illustrated in FIG. 9.

First, in Step S1, the B-mode image in which at least the blood vessel region BR is imaged is acquired, and is displayed on the display unit 8. In this case, an ultrasound beam is transmitted from the plurality of transducers of the transducer array 2 according to the drive signal from the transmission unit 3, the reception signal is output to the reception unit 4 from each transducer which has received the ultrasound echo from the subject, is amplified in the amplification unit 24, is subjected to the AD conversion in the AD conversion unit 25, and is phased and added in the beam former 26, and thereby the reception data is generated. The reception data is subjected to the envelope detection processing by the signal processing unit 27 of the B-mode processing unit 5 to become the B-mode image signal, and is output to the display control unit 7 via the DSC 28 and the image processing unit 29, and the B-mode image is displayed on the display unit 8 by the display control unit 7.

In subsequent Step S2, in a case where the cursor steering angle A1 is selected on the basis of the user's operation through the operation unit 17, the selected cursor steering angle A1 is accepted by the cursor steering angle acceptance unit 19 to be output from the device control unit 16 to the display control unit 7, and the scan line SL having the cursor steering angle A1 is displayed to be superimposed on the B-mode image displayed on the display unit 8. Further, the initially set Doppler gate DG is displayed on the scan line SL having the cursor steering angle A1.

In this state, in a case where the user operates the operation unit 17 to designate the position of each of the upper gate part G1 and the lower gate part G2 of the Doppler gate DG, the designated position is accepted by the gate position acceptance unit 21 to be output from the device control unit 16 to the gate setting unit 10, and the gate setting unit 10 moves the upper gate part G1 and the lower gate part G2 of the initially set Doppler gate DG to set a new Doppler gate DG. The new Doppler gate DG is output from the gate setting unit 10 to the display control unit 7, and is displayed to be superimposed on the B-mode image on the display unit 8. In this manner, the Doppler gate DG is set within the blood vessel region BR on the B-mode image.

Further, the information on the Doppler gate DG set by the gate setting unit 10 is output from the gate setting unit 10 to the Doppler processing unit 6 of the image generation unit 9, and the Doppler processing unit 6 calculates the blood flow velocity on the basis of the Doppler data in the region interposed between the upper gate part G1 and the lower gate part G2 of the Doppler gate DG, and generates the Doppler waveform image.

In Step S3, in a case where the user sets the blood flow correction angle A2 by operating the operation unit 17 in accordance with the inclination angle of the blood vessel region BR on the B-mode image, the set blood flow correction angle A2 is accepted by the blood flow correction angle acceptance unit 20 to be output from the device control unit 16 to the display control unit 7, and the blood flow correction angle line BL as the line segment having the blood flow correction angle A2 is displayed to be superimposed on the B-mode image displayed on the display unit 8.

Figure 10:
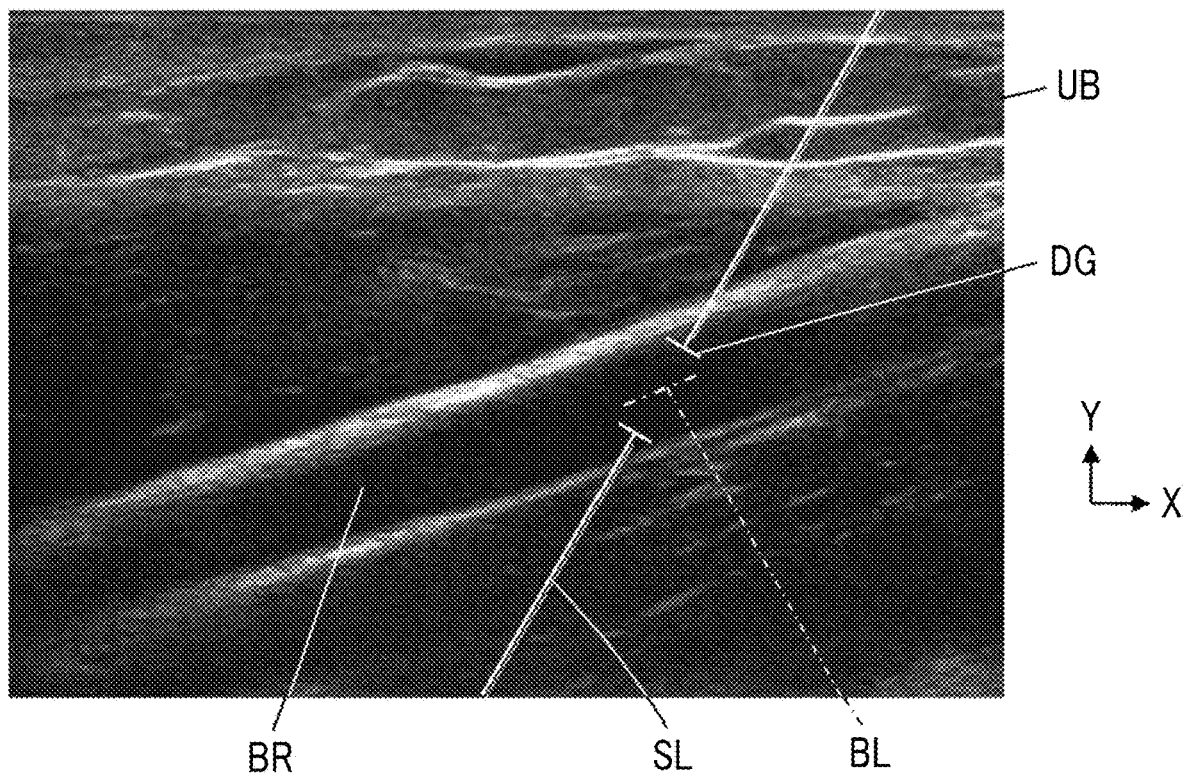
FIG. 10 is a diagram illustrating an example of a B-mode image on which detection of the vascular wall is performed in the first embodiment of the invention.

In this manner, an example of the B-mode image UB on which the scan line SL having the cursor steering angle A1, the Doppler gate DG, the blood flow correction angle line BL are displayed to be superimposed is illustrated in FIG. 10. The Doppler gate DG is set within the blood vessel region BR.

The blood vessel gradient acquisition unit 11 calculates the blood vessel gradient A3 on the basis of the cursor steering angle A1 accepted by the cursor steering angle acceptance unit 19 and the blood flow correction angle A2 accepted by the blood flow correction angle acceptance unit 20, using Equation (1).

$$A3 = 90° - (A1 + A2) \quad (1)$$

Figure 11:
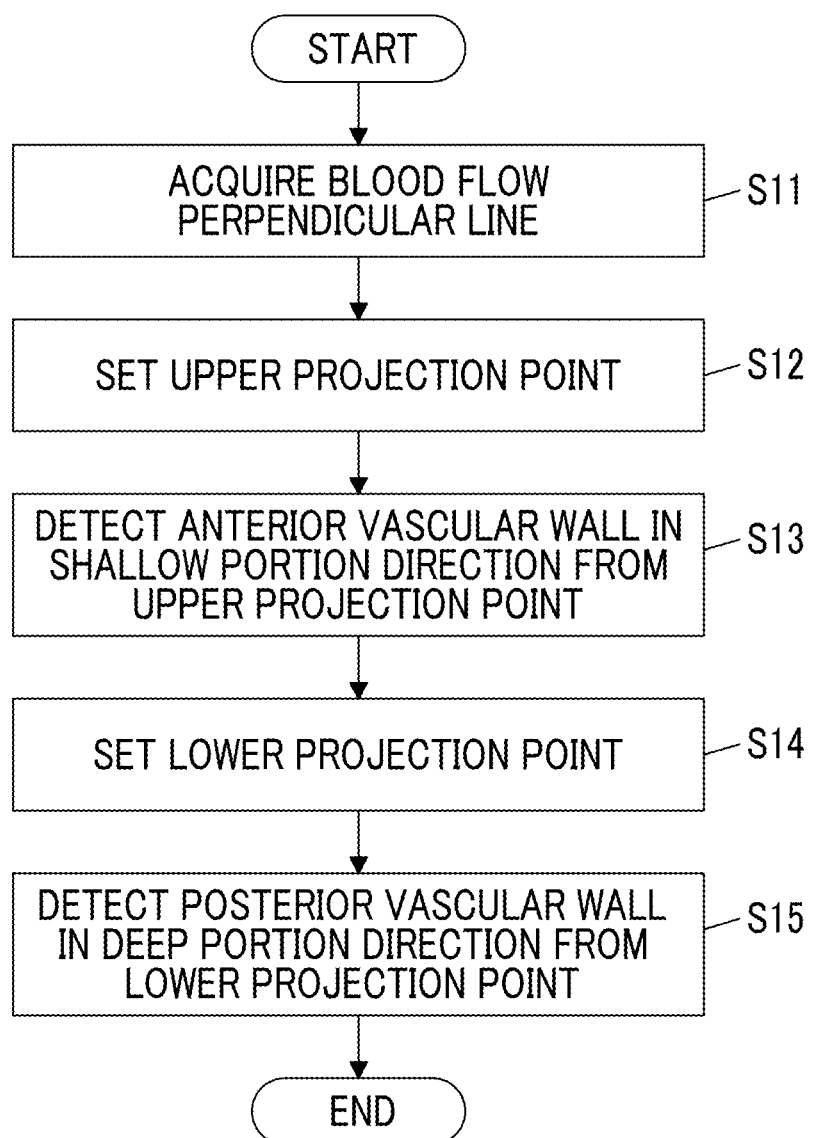
FIG. 11 is a flowchart illustrating a vascular wall detection operation in the first embodiment of the invention.

In subsequent Step S4, by the vascular wall detection unit 12, image analysis is performed on the B-mode image, and the vascular wall is detected. FIG. 11 is a flowchart illustrating the vascular wall detection operation.

First, in Step S11, as illustrated in FIG. 8, the blood flow perpendicular line NL which passes through the center point C of the Doppler gate DG and extends perpendicular to the blood flow correction angle line BL is acquired by the blood flow perpendicular line acquisition unit 35 of the vascular wall detection unit 12.

Next, in Step S12, by the anterior wall detection unit 36 of the vascular wall detection unit 12, the upper projection point P1 which is obtained by projecting the upper gate point G1P of the Doppler gate DG on the blood flow perpendicular line NL is set, and further the point P2 which is positioned in the shallow portion direction apart from the upper projection point P1 by the predetermined distance D1 along the blood flow perpendicular line NL is set.

Then, in Step S13, the anterior vascular wall W1 is detected within the range from the upper projection point P1 to the point P2 by the anterior wall detection unit 36. The anterior vascular wall W1 can be detected by detecting a point where the intensity (brightness) of the B-mode image signal at each point on the blood flow perpendicular line NL is maximum or a point where the amount of change in intensity of the B-mode image signal at each point is maximum.

Similarly, in Step S14, by the posterior wall detection unit 37 of the vascular wall detection unit 12, the lower projection point P3 which is obtained by projecting the lower gate point G2P of the Doppler gate DG on the blood flow perpendicular line NL is set, and further the point P4 which is positioned in the deep portion direction apart from the lower projection point P3 by the predetermined distance D2 along the blood flow perpendicular line NL is set.

Then, in Step S15, the posterior vascular wall W2 is detected within the range from the lower projection point P3 to the point P4 by the posterior wall detection unit 37. The posterior vascular wall W2 can be detected by detecting a point where the intensity (brightness) of the B-mode image signal at each point on the blood flow perpendicular line NL is maximum or a point where the amount of change in intensity of the B-mode image signal at each point is maximum.

In this manner, since the anterior vascular wall W1 is detected within the range from the upper projection point P1, which is obtained by projecting the upper gate point G1P of the Doppler gate DG on the blood flow perpendicular line NL, to the point P2 positioned in the shallow portion direction apart from the upper projection point P1 by the predetermined distance D1 along the blood flow perpendicular line NL, and the posterior vascular wall W2 is detected within the range from the lower projection point P3, which is obtained by projecting the lower gate point G2P of the Doppler gate DG on the blood flow perpendicular line NL, to the point P4 positioned in the deep portion direction apart from the lower projection point P3 by the predetermined distance D2 along the blood flow perpendicular line NL, even in a case where the maximum point of the B-mode intensity due to the multiple reflection appears in the Doppler gate DG, the anterior vascular wall W1 and the posterior vascular wall W2 can be accurately detected without erroneously detecting the maximum point.

Further, since the upper gate point G1P and the lower gate point G2P are set to be positioned inside the blood vessel region BR by, for example, about 1 to 2 mm from the contour of the blood vessel region BR on the B-mode image, even in a case where the maximum point of the B-mode intensity due to the multiple reflection appears in the vicinity of the anterior vascular wall W1 and the posterior vascular wall W2, the anterior vascular wall W1 and the posterior vascular wall W2 can be accurately detected.

In this manner, in a case where the anterior vascular wall W1 and the posterior vascular wall W2 are detected, by the cross-sectional area calculation unit 13, the blood vessel diameter is calculated from the positions of the anterior vascular wall W1 and the posterior vascular wall W2 on the blood flow perpendicular line NL and the cross-sectional area of the blood vessel is calculated from the blood vessel diameter assuming that the blood vessel has a circular cross section, in Step S5.

Further, in Step S6, the average blood flow velocity for one heartbeat period is calculated by the average blood flow velocity calculation unit 15 on the basis of the blood flow velocity calculated by the Doppler processing unit 6.

In subsequent Step S7, the blood flow volume representing the volume of the blood flowing in the blood vessel per unit time is measured by the blood flow volume measurement unit 14 on the basis of the cross-sectional area of the blood vessel calculated by the cross-sectional area calculation unit 13 and the average blood flow velocity calculated by the average blood flow velocity calculation unit 15.

Specifically, in a case where the cross-sectional area of the blood vessel is set as CSA (cm$^2$) and the average blood flow velocity is set as MNV (m/s), a blood flow volume VF (ml/min) can be calculated using following Equation (2).

$$VF = CSA \times MNV \times 60(\text{s/min}) \times 100(\text{cm/m}) \quad (2)$$

Figure 12:
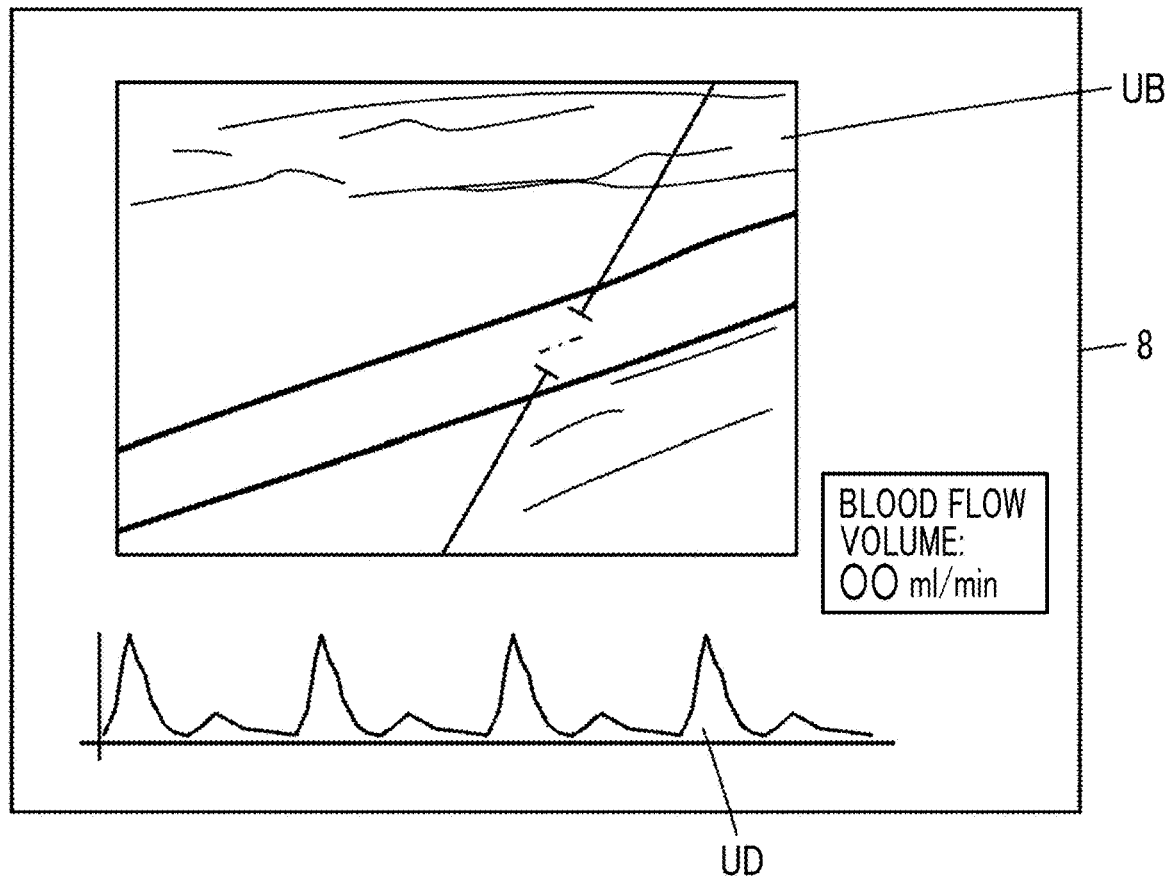
FIG. 12 is a diagram schematically illustrating a display example of a B-mode image and a Doppler image in the first embodiment of the invention.

As illustrated in FIG. 12, the Doppler waveform image UD generated by the Doppler processing unit 6 can be displayed to be aligned with the B-mode image UB on the display unit 8. Further, the blood flow volume measured by the blood flow volume measurement unit 14 is set to the display unit 8 via the display control unit 7, and is displayed on the display unit 8.

It is possible for the user to check the blood flow volume measured by the blood flow volume measurement unit 14 while observing the B-mode image UB and the Doppler waveform image UD displayed on the display unit 8.

In the first embodiment, the blood flow correction angle acceptance unit 20 connected to the operation unit 17 is provided, and the blood flow correction angle A2 set by the user's operation through the operation unit 17 is accepted by the blood flow correction angle acceptance unit 20, but the invention is not limited thereto, and a configuration in which the blood flow correction angle A2 is automatically detected may be adopted.

Figure 13:
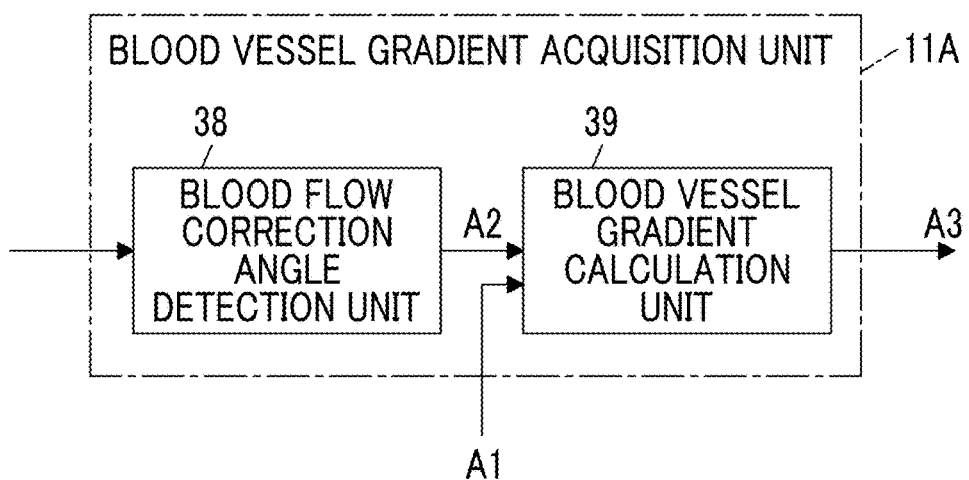
FIG. 13 is a block diagram illustrating an internal configuration of a blood vessel gradient acquisition unit in a modification example of the first embodiment of the invention.

FIG. 13 illustrates an internal configuration of a blood vessel gradient acquisition unit 11A in a modification example of the first embodiment. The blood vessel gradient acquisition unit 11A has a configuration in which a blood flow correction angle detection unit 38 and a blood vessel gradient calculation unit 39 are connected in series. The ultrasound diagnostic apparatus according to the modification example of the first embodiment uses the blood vessel gradient acquisition unit 11A instead of the blood vessel gradient acquisition unit 11 in the ultrasound diagnostic apparatus 1 of the first embodiment illustrated in FIG. 1, and has the same configuration as the ultrasound diagnostic apparatus 1 of the first embodiment except the blood vessel gradient acquisition unit 11A.

The blood flow correction angle detection unit 38 recognizes the blood vessel region BR by performing the image analysis on the B-mode image generated by the B-mode processing unit 5, and detects the inclination angle of the blood vessel region BR with respect to the scan line SL of the cursor steering angle A1, as the blood flow correction angle A2.

Specifically, the blood flow correction angle detection unit 38 can (1) extract the B-mode image near the Doppler gate DG, (2) create a blurred image by blurring the entire extracted B-mode image, (3) detect each of the anterior vascular wall and the posterior vascular wall which are respectively on the upper side and the lower side of the Doppler gate DG by performing edge detection, and (4) approximate each of the detected anterior vascular wall and the detected posterior vascular wall with a straight line to obtain an average angle of the approximate straight lines as the blood flow correction angle A2.

Alternatively, the blood flow correction angle detection unit 38 can (1) extract the B-mode image near the Doppler gate DG, (2) create a blurred image by blurring the entire extracted B-mode image, (3) detect a region having a small brightness difference equal to or lower than a predetermined gradation with respect to the brightness of the center point C of the Doppler gate DG, and detect the upper boundary line and the lower boundary line of the region as the anterior vascular wall and the posterior vascular wall, respectively, and (4) approximate each of the detected anterior vascular wall and the detected posterior vascular wall with a straight line to obtain an average angle of the approximate straight lines as the blood flow correction angle A2.

The blood vessel gradient calculation unit 39 calculates the blood vessel gradient A3 on the basis of the blood flow correction angle A2 detected by the blood flow correction angle detection unit 38 and the cursor steering angle A1 accepted by the cursor steering angle acceptance unit 19, using Equation (1) described above.

By using such a blood vessel gradient acquisition unit 11A, the blood flow correction angle A2 can be automatically detected without setting the blood flow correction angle A2 by the user's operation through the operation unit 17, and thus the anterior vascular wall W1 and the posterior vascular wall W2 can be detected by the vascular wall detection unit 12.

In the ultrasound diagnostic apparatus according to the modification example of the first embodiment using the blood vessel gradient acquisition unit 11A, since the blood flow correction angle A2 is automatically detected by the blood flow correction angle detection unit 38, the blood flow correction angle acceptance unit 20 may not be provided, but a configuration can be adopted in which the blood flow correction angle A2 automatically detected by the blood flow correction angle detection unit 38 is finely adjusted by the user's operation through the operation unit 17.

The finely adjusted blood flow correction angle A2 is accepted by the blood flow correction angle acceptance unit 20, it is possible to perform again the detection of the anterior vascular wall W1 and the posterior vascular wall W2 by the vascular wall detection unit 12 on the basis of the finely adjusted blood flow correction angle A2, the calculation of the cross-sectional area of the blood vessel by the cross-sectional area calculation unit 13, and the measurement of the blood flow volume by the blood flow volume measurement unit 14.

In addition, the average blood flow velocity can be calculated again by the average blood flow velocity calculation unit 15 by changing the scale of the pulse-Doppler in the Doppler processing unit 6 on the basis of the finely adjusted blood flow correction angle A2, and the blood flow volume measurement unit 14 can measure again the blood flow volume using the average blood flow velocity and the cross-sectional area of the blood vessel calculated by the cross-sectional area calculation unit 13 before the blood flow correction angle A2 is finely adjusted.

In this manner, it is possible to measure the blood flow volume in which the finely adjusted blood flow correction angle A2 is reflected.

Second Embodiment

Figure 14:
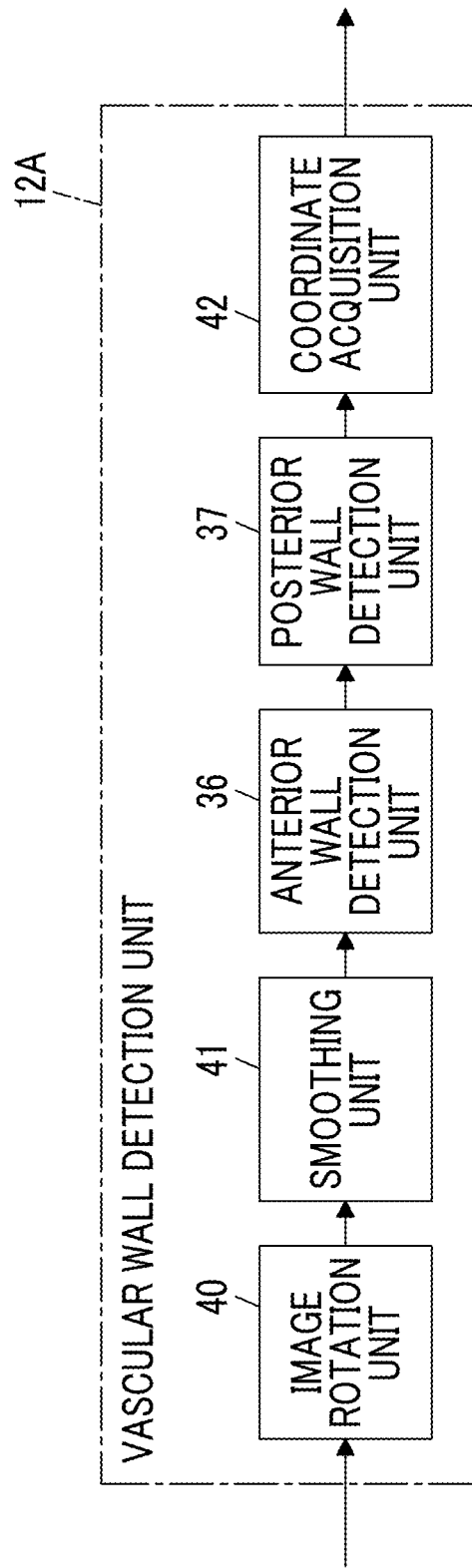
FIG. 14 is a block diagram illustrating an internal configuration of a vascular wall detection unit in a second embodiment of the invention.

FIG. 14 illustrates an internal configuration of a vascular wall detection unit 12A used in an ultrasound diagnostic apparatus according to a second embodiment. The vascular wall detection unit 12A has a configuration in which an image rotation unit 40, a smoothing unit 41, the anterior wall detection unit 36, the posterior wall detection unit 37, and a coordinate acquisition unit 42 are connected in series. The ultrasound diagnostic apparatus according to the second embodiment uses the vascular wall detection unit 12A instead of the vascular wall detection unit 12 in the ultrasound diagnostic apparatus 1 of the first embodiment illustrated in FIG. 1, and has the same configuration as the ultrasound diagnostic apparatus 1 of the first embodiment except the vascular wall detection unit 12A.

The image rotation unit 40 of the vascular wall detection unit 12A rotates the B-mode image UB by the blood vessel gradient A3 acquired by the blood vessel gradient acquisition unit 11 such that the blood vessel region BR extends horizontally on the screen of the display unit 8, to acquire a B-mode image UB1.

The smoothing unit 41 of the vascular wall detection unit 12A performs smoothing processing along the horizontal direction on the B-mode image UB1 acquired by the image rotation unit 40.

The anterior wall detection unit 36 and the posterior wall detection unit 37 of the vascular wall detection unit 12A are the same as the anterior wall detection unit 36 and the posterior wall detection unit 37 of the vascular wall detection unit 12 in the ultrasound diagnostic apparatus 1 of the first embodiment, respectively, and detect the anterior vascular wall W1 and the posterior vascular wall W2 in the B-mode image UB1 which is rotated by the blood vessel gradient A3.

The coordinate acquisition unit 42 of the vascular wall detection unit 12A acquires coordinates of the anterior vascular wall W1 and the posterior vascular wall W2, which are detected by the anterior wall detection unit 36 and the posterior wall detection unit 37, on the B-mode image UB in a case where the B-mode image UB1 is rotated reversely by the blood vessel gradient A3 to be returned to the original B-mode image UB.

Next, the operation of the ultrasound diagnostic apparatus according to the second embodiment will be described.

Figure 9:
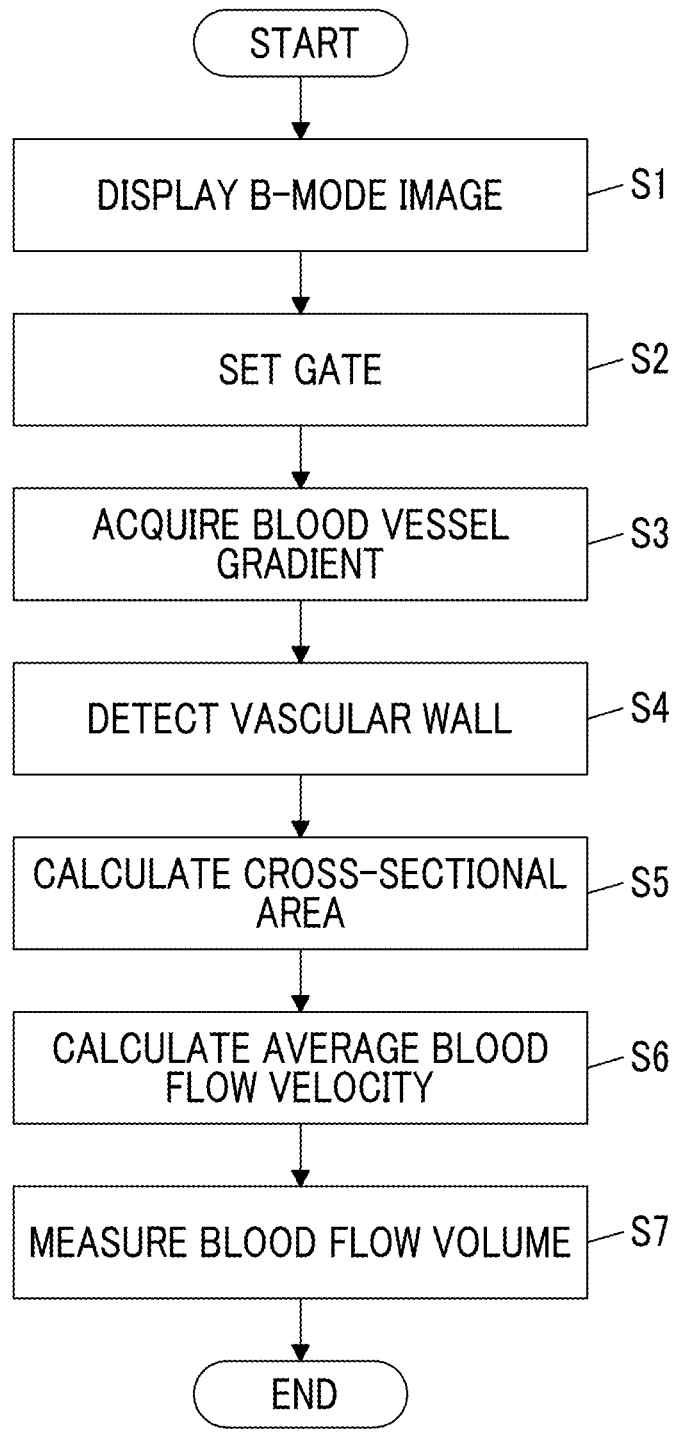
FIG. 9 is a flowchart illustrating an operation of the ultrasound diagnostic apparatus according to the first embodiment of the invention.

As with the ultrasound diagnostic apparatus 1 of the first embodiment, in Step S1 of the flowchart illustrated in FIG. 9, the B-mode image UB in which at least the blood vessel region BR is imaged is acquired, and is displayed on the display unit 8.

In subsequent Step S2, the cursor steering angle A1 is accepted by the cursor steering angle acceptance unit 19 on the basis of the user's operation, the position of each of the upper gate part G1 and the lower gate part G2 of the Doppler gate DG is accepted by the gate position acceptance unit 21, and the Doppler gate DG is set within the blood vessel region BR on the B-mode image by the gate setting unit 10.

In Step S3, the blood flow correction angle A2 is accepted by the blood flow correction angle acceptance unit 20 on the basis of the user's operation, and the blood vessel gradient A3 is calculated by the blood vessel gradient acquisition unit 11.

Figure 15:
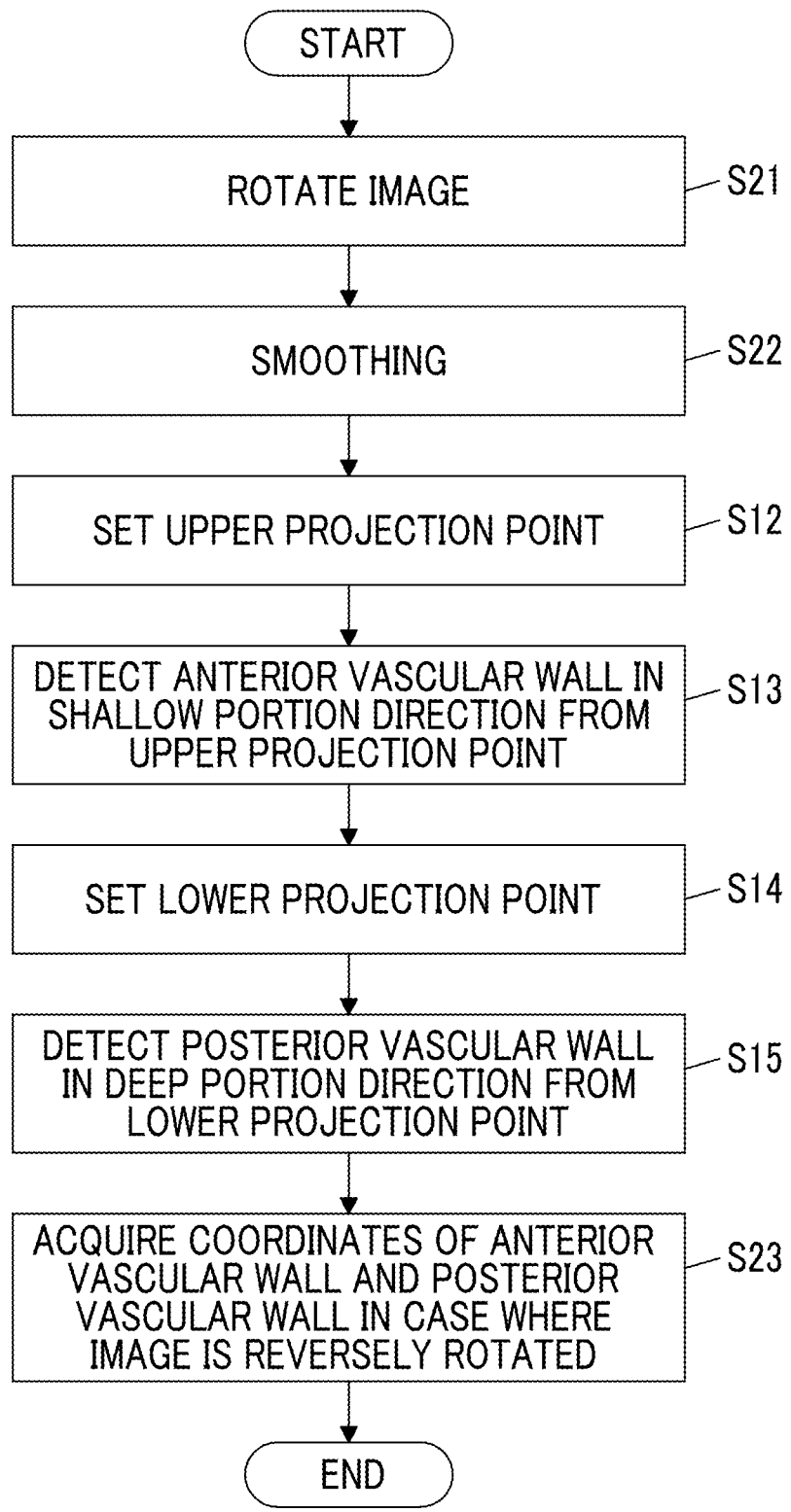
FIG. 15 is a flowchart illustrating a vascular wall detection operation in the second embodiment of the invention.

In subsequent Step S4, the detection of the vascular wall is performed, and the vascular wall detection operation in the vascular wall detection unit 12A of the ultrasound diagnostic apparatus of the second embodiment is illustrated in the flowchart of FIG. 15.

Figure 16:
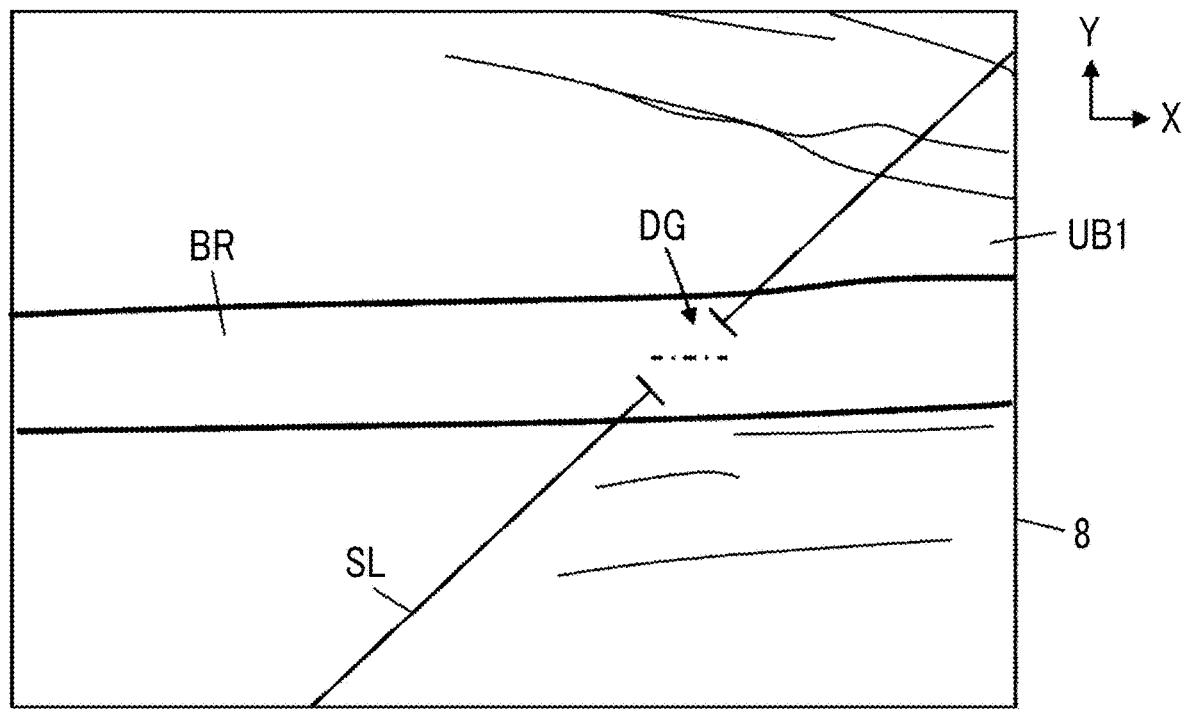
FIG. 16 is a diagram schematically illustrating a rotated B-mode image in the second embodiment of the invention.

First, in Step S21, by the image rotation unit 40 of the vascular wall detection unit 12A, the B-mode image UB is rotated by the blood vessel gradient A3 such that the blood vessel region BR extends horizontally on the screen of the display unit 8, and the B-mode image UB1 is acquired. For example, as illustrated in FIG. 6, in the B-mode image UB, the blood vessel region BR extends in a direction inclined by the blood vessel gradient A3 with respect to the horizontal direction on the screen of the display unit 8, that is, the X direction. Therefore, in a case where the B-mode image UB illustrated in FIG. 6 is rotated clockwise by the blood vessel gradient A3, the B-mode image UB1 in which the blood vessel region BR extends in the horizontal direction on the screen of the display unit 8, that is, the X direction as illustrated in FIG. 16 is acquired.

In a case where the B-mode image UB1 is acquired, in Step S22, the smoothing processing along the horizontal direction is performed on the B-mode image UB1 by the smoothing unit 41. Here, the smoothing processing is processing for removing a noise in the B-mode image UB1 by smoothing the brightness value at each point of the B-mode image UB1, and the smoothing processing can be implemented by using smoothing filters such as moving average filters, Gaussian smoothing filters, and median filters, for example.

In the B-mode image UB1, since the blood vessel region BR extends in the horizontal direction, the anterior vascular wall W1 and the posterior vascular wall W2 also extend in the horizontal direction, and the blood vessel has a layered structure, it is possible to effectively and easily remove the noise by performing smoothing processing along the horizontal direction.

In a case where the smoothing processing is ended, as in the first embodiment, the anterior vascular wall W1 and the posterior vascular wall W2 on the B-mode image UB1 are detected by the anterior wall detection unit 36 and the posterior wall detection unit 37 of the vascular wall detection unit 12A in subsequent Steps S12 to S15.

Figure 17:
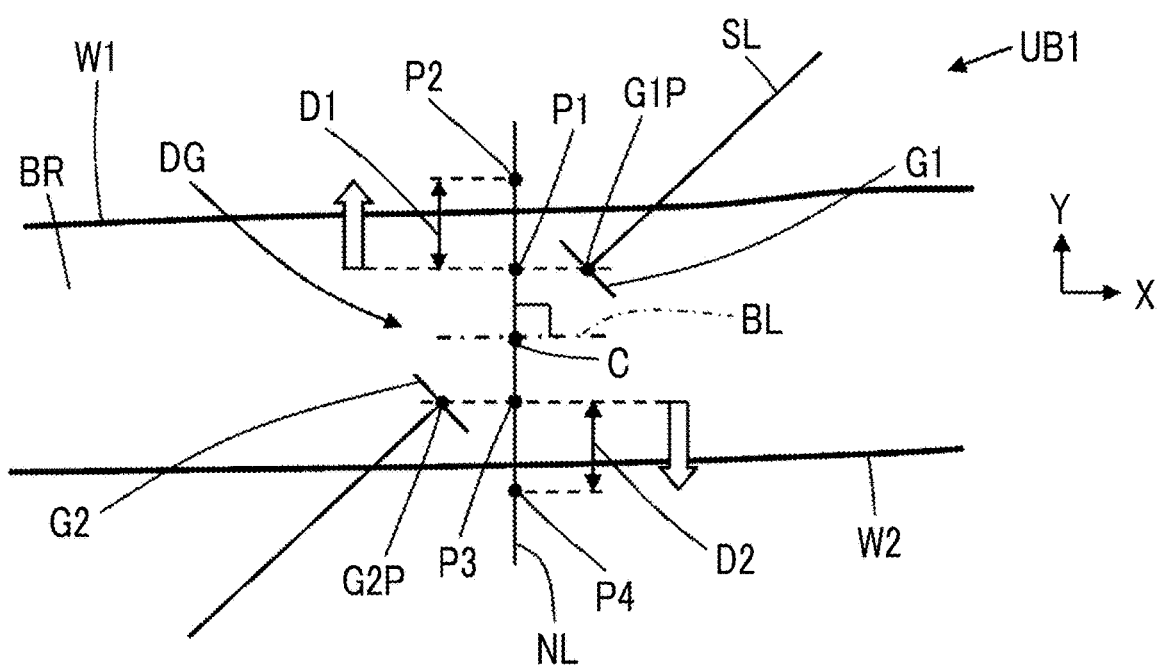
FIG. 17 is a diagram schematically illustrating a method of detecting a vascular wall in the second embodiment of the invention.

That is, as illustrated in FIG. 17, in Step S12, the upper projection point P1 which is obtained by projecting the upper gate point $G11^3$ of the Doppler gate DG on the blood flow perpendicular line NL is set by the anterior wall detection unit 36 of the vascular wall detection unit 12A, and further, the point P2 which is positioned in the shallow portion direction apart from the upper projection point P1 by the predetermined distance D1 along the blood flow perpendicular line NL is set. Here, in the B-mode image UB1, the blood flow correction angle line BL extends in the X direction as the horizontal direction, and the blood flow perpendicular line NL is a line segment which passes through the center point C of the Doppler gate DG and extends in the Y direction as the vertical direction.

In Step S13, the anterior vascular wall W1 is detected within the range from the upper projection point P1 to the point P2 by the anterior wall detection unit 36.

Similarly, in Step S14, by the posterior wall detection unit 37, the lower projection point P3 which is obtained by projecting the lower gate point G2P of the Doppler gate DG on the blood flow perpendicular line NL is set, and the point P4 which is positioned in the deep portion direction apart from the lower projection point P3 by the predetermined distance D2 along the blood flow perpendicular line NL is set. Further, in Step S15, the posterior vascular wall W2 is detected within the range from the lower projection point P3 to the point P4 by the posterior wall detection unit 37.

In this manner, in a case where the anterior vascular wall W1 and the posterior vascular wall W2 in the B-mode image UB1 are detected, in Step S23, the coordinate acquisition unit 42 of the vascular wall detection unit 12A acquires coordinates of the anterior vascular wall W1 and the posterior vascular wall W2 in the B-mode image UB before being rotated, that is, in the B-mode image UB in which the blood vessel region BR extends in the direction inclined by the blood vessel gradient A3 with respect to the horizontal direction.

The coordinate acquisition unit 42 can calculate the coordinates of the anterior vascular wall W1 and the posterior vascular wall W2 in a case where the B-mode image UB1 is rotated reversely by the blood vessel gradient A3 to be returned to the original B-mode image UB, by performing a coordinate transform operation on the coordinates of the anterior vascular wall W1 and the posterior vascular wall W2 in the B-mode image UB1, for example.

In a case where the coordinates of the anterior vascular wall W1 and the posterior vascular wall W2 are acquired by the coordinate acquisition unit 42 of the vascular wall detection unit 12A, the cross-sectional area of the blood vessel is calculated by the cross-sectional area calculation unit 13 in Step S5 of the flowchart of FIG. 9, the average blood flow velocity for one heartbeat period is calculated by the average blood flow velocity calculation unit 15 in subsequent Step S6, and the blood flow volume representing the volume of the blood flowing in the blood vessel per unit time is measured in Step S7 by the blood flow volume measurement unit 14 on the basis of the cross-sectional area of the blood vessel calculated by the cross-sectional area calculation unit 13 and the average blood flow velocity calculated by the average blood flow velocity calculation unit 15.

Figure 18:
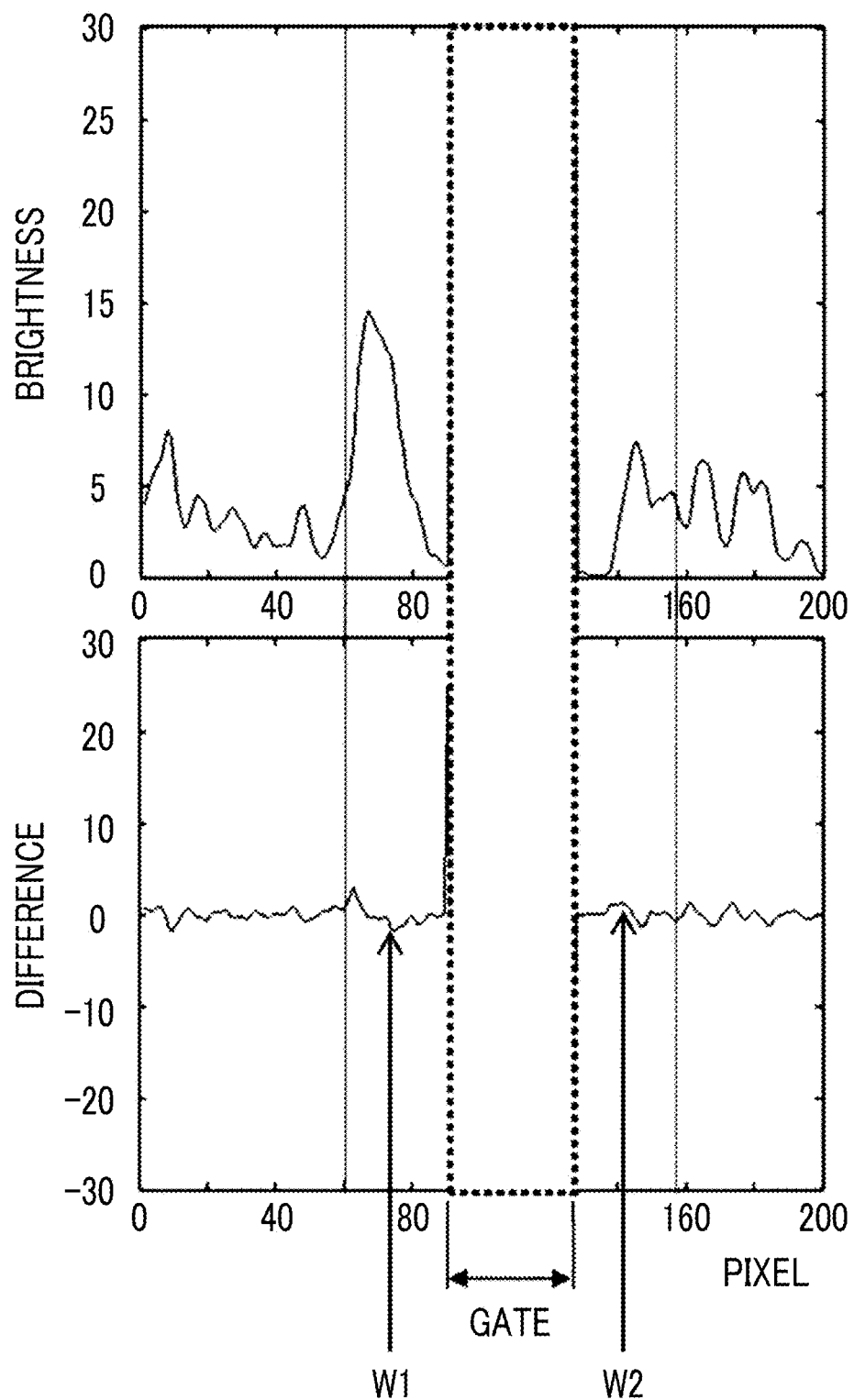
FIG. 18 is a diagram illustrating a profile of a B-mode image smoothed in a horizontal direction after being rotated.

Here, FIG. 18 illustrates an example of a brightness profile on the blood flow perpendicular line NL and a profile of a difference (amount of change) of brightness at respective adjacent points on the blood flow perpendicular line NL, in the B-mode image UB1 obtained by rotating the B-mode image UB by the blood vessel gradient A3 and performing the smoothing processing along the horizontal direction, using the ultrasound diagnostic apparatus of the second embodiment. The anterior vascular wall W1 and the posterior vascular wall W2 are detected on the basis of the difference of brightness. The blood vessel diameter is calculated to be 3.67 mm from the detected anterior vascular wall W1 and posterior vascular wall W2.

Figure 19:
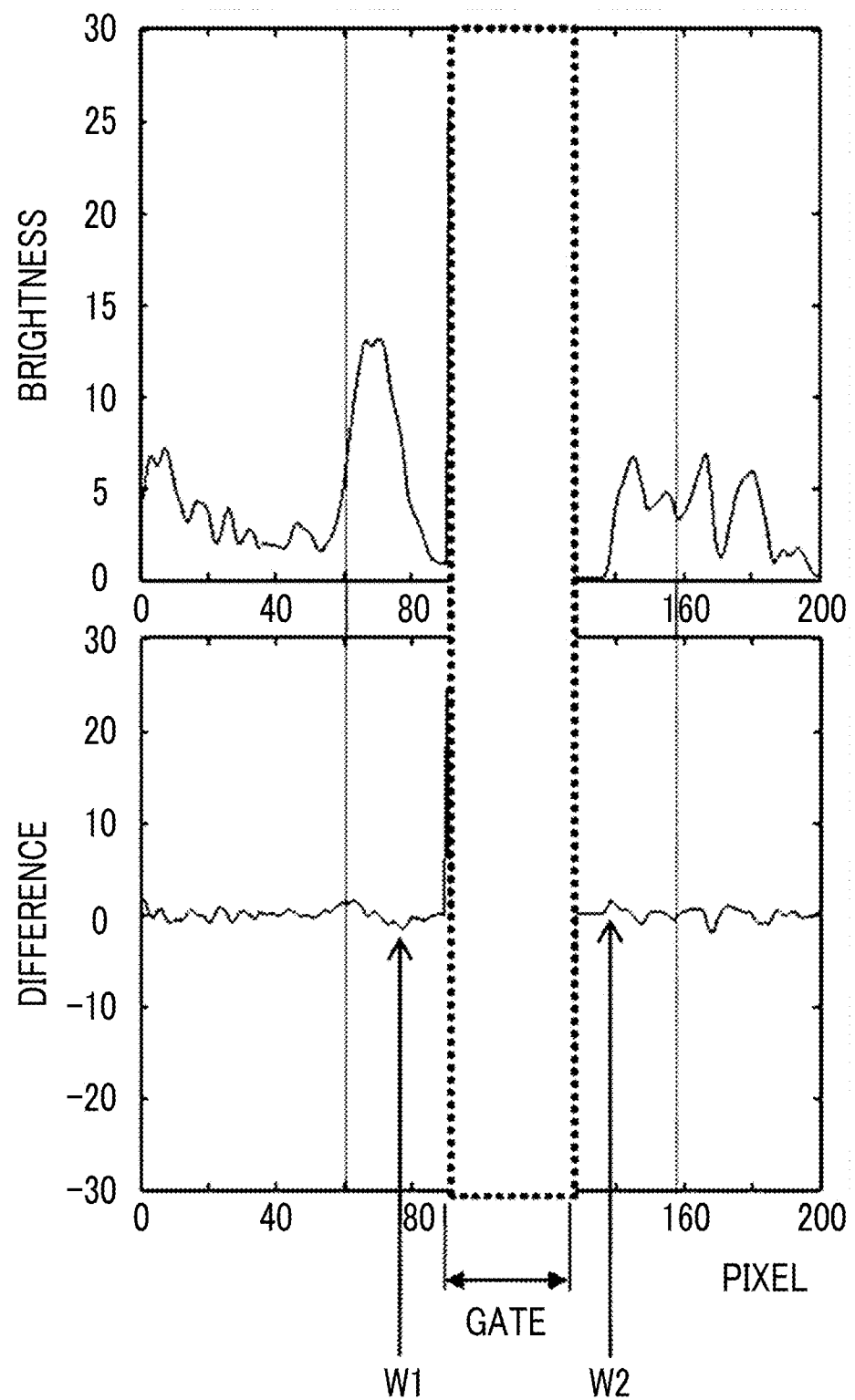
FIG. 19 is a diagram illustrating a profile of a rotated B-mode image after being smoothed in the horizontal direction.

On the other hand, FIG. 19 illustrates an example of a brightness profile on the same blood flow perpendicular line NL and a profile of a difference (amount of change) of brightness at respective adjacent points on the blood flow perpendicular line NL in a case where the same B-mode image UB is subjected to the smoothing processing along the horizontal direction and then is rotated by the blood vessel gradient A3. The anterior vascular wall W1 and the posterior vascular wall W2 are detected on the basis of the difference of brightness, and the blood vessel diameter is calculated to be 3.39 mm from the detected anterior vascular wall W1 and posterior vascular wall W2.

In addition, it can be seen that the brightness profile illustrated in FIG. 18 has a sharper shape than the brightness profile illustrated in FIG. 19.

Thus, in a case where the smoothing processing along the horizontal direction is performed on the B-mode image UB in which the blood vessel region BR extends in a direction inclined by the blood vessel gradient A3 with respect to the horizontal direction and then the B-mode image UB is rotated, the blood vessel diameter is calculated to be smaller than a case where the smoothing processing along the horizontal direction is performed on the B-mode image UB1 after being rotated as in the second embodiment. As a result, the cross-sectional area of the blood vessel is also calculated to be smaller, and the blood flow volume measured by the blood flow volume measurement unit 14 is decreased by about 15%.

By performing the smoothing processing in the horizontal direction on the B-mode image UB1 acquired by rotating the B-mode image UB by the blood vessel gradient A3 as in the second embodiment, the anterior vascular wall W1 and the posterior vascular wall W2 can be accurately detected, and the accurate blood flow volume can be measured.

In the second embodiment, an example has been described in which the coordinate acquisition unit 42 performs the coordinate transformation on the coordinates of the anterior vascular wall W1 and the posterior vascular wall W2 on the B-mode image UB1 to calculate the coordinates of the anterior vascular wall W1 and the posterior vascular wall W2 in the case of reversely rotating the B-mode image UB1 by the original blood vessel gradient A3, but a method of calculating the coordinates of the anterior vascular wall W1 and the posterior vascular wall W2 is not limited thereto. For example, the B-mode image UB1 can be rotated reversely by the original blood vessel gradient A3 to be returned to the B-mode image UB, and then the coordinates of the anterior vascular wall W1 and the posterior vascular wall W2 on the B-mode image can be acquired.

Third Embodiment

Figure 20:
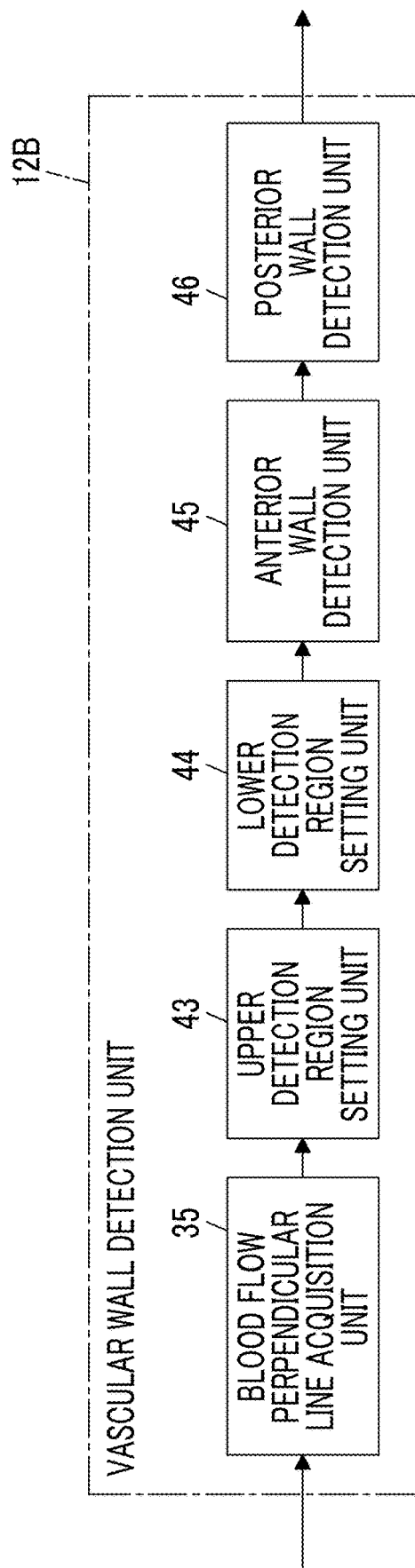
FIG. 20 is a block diagram illustrating an internal configuration of a vascular wall detection unit in a third embodiment of the invention.

FIG. 20 illustrates an internal configuration of a vascular wall detection unit 12B used in an ultrasound diagnostic apparatus according to a third embodiment. The vascular wall detection unit 12B has a configuration in which the blood flow perpendicular line acquisition unit 35, an upper detection region setting unit 43, a lower detection region setting unit 44, an anterior wall detection unit 45, and a posterior wall detection unit 46 are connected in series. The ultrasound diagnostic apparatus according to the third embodiment uses the vascular wall detection unit 12B instead of the vascular wall detection unit 12 in the ultrasound diagnostic apparatus 1 of the first embodiment illustrated in FIG. 1, and has the same configuration as the ultrasound diagnostic apparatus 1 of the first embodiment except the vascular wall detection unit 12B.

The blood flow perpendicular line acquisition unit 35 of the vascular wall detection unit 12B is the same as the blood flow perpendicular line acquisition unit 35 of the vascular wall detection unit 12 in the ultrasound diagnostic apparatus 1 of the first embodiment, and calculates and acquires the blood flow perpendicular line NL which passes through the center point C of the Doppler gate DG and extends perpendicular to the blood flow correction angle line BL.

Figure 21:
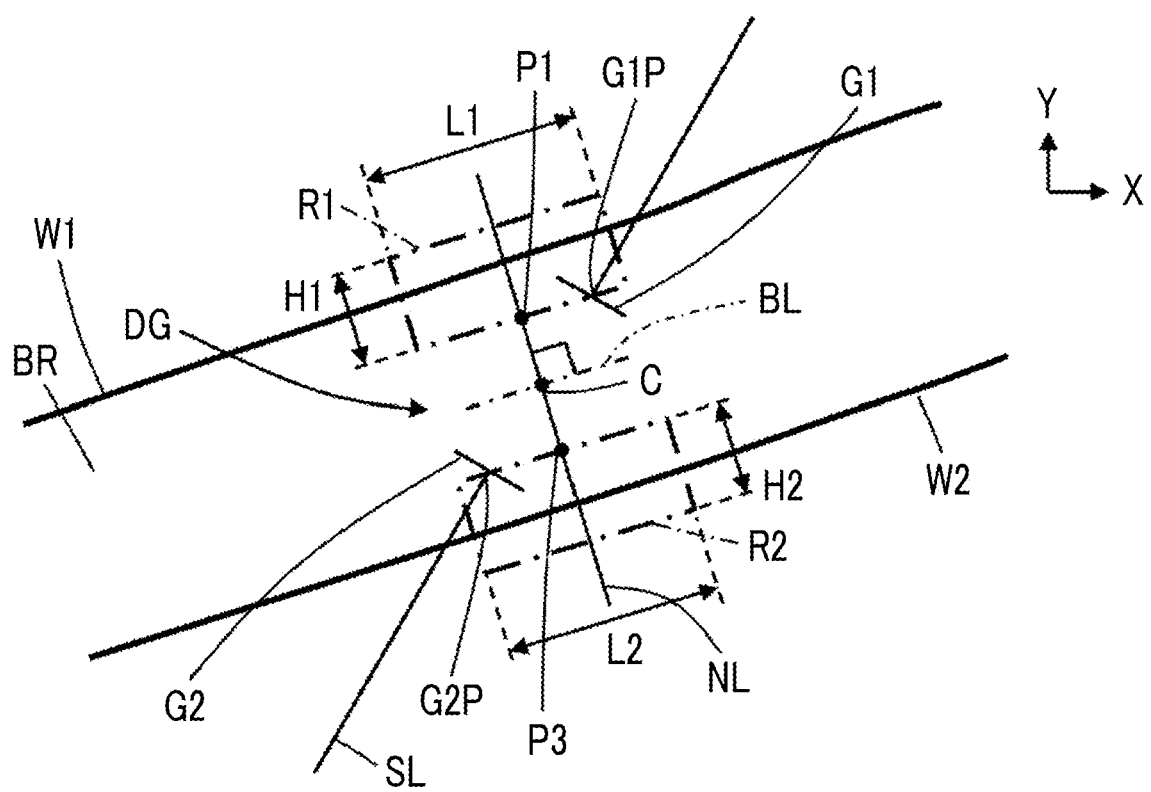
FIG. 21 is a diagram schematically illustrating a method of detecting a vascular wall in the third embodiment of the invention.

As illustrated in FIG. 21, the upper detection region setting unit 43 of the vascular wall detection unit 12B sets an upper detection region R1 using the upper projection point P1 obtained by projecting the upper gate point G1P of the Doppler gate DG on the blood flow perpendicular line NL as a reference. The upper detection region R1 is a region for searching for the anterior vascular wall W1, and has a rectangular shape having a predetermined range which extends in the shallow portion direction by a length H1 from the upper projection point P1 along the blood flow perpendicular line NL and extends parallel to the blood flow correction angle line BL (parallel to the blood vessel gradient A3) by a length L1 such that the upper projection point P1 is in the center.

The lower detection region setting unit 44 of the vascular wall detection unit 12B sets a lower detection region R2 using the lower projection point P3 obtained by projecting the lower gate point G2P of the Doppler gate DG on the blood flow perpendicular line NL as a reference. The lower detection region R2 is a region for searching for the posterior vascular wall W2, and has a rectangular shape having a predetermined range which extends in the deep portion direction by a length H2 from the lower projection point P3 along the blood flow perpendicular line NL and extends parallel to the blood flow correction angle line BL (parallel to the blood vessel gradient A3) by a length L2 such that the lower projection point P3 is in the center.

The anterior wall detection unit 45 of the vascular wall detection unit 12B is configured to detect the anterior vascular wall W1 within the upper detection region R1, and the anterior wall detection unit 45 detects an anterior vascular wall boundary line by searching the upper detection region R1, and detects an intersection between the blood flow perpendicular line NL and the detected anterior vascular wall boundary line as the anterior vascular wall W1.

The posterior wall detection unit 46 of the vascular wall detection unit 12B is configured to detect the posterior vascular wall W2 within the lower detection region R2, and the posterior wall detection unit 46 detects a posterior vascular wall boundary line by searching the lower detection region R2, and detects an intersection between the blood flow perpendicular line NL and the detected posterior vascular wall boundary line as the posterior vascular wall W2.

The anterior wall detection unit 45 can detect the anterior vascular wall boundary line on the basis of the intensity (brightness) of the B-mode image signal at each point and the amount of change in intensity of the B-mode image signal at each point in the upper detection region R1, and the posterior wall detection unit 46 can detect the posterior vascular wall boundary line on the basis of the intensity (brightness) of the B-mode image signal at each point and the amount of change in intensity of the B-mode image signal at each point in the lower detection region R2. For example, although not illustrated, the anterior wall detection unit 45 can detect, as the anterior vascular wall W1, a location where the amount of change in B-mode intensity is maximum, by assuming a search line parallel to the blood flow perpendicular line NL and performing search on the search line in the shallow portion direction while moving the search line in a direction parallel to the blood flow correction angle line BL in the upper detection region R1. Similarly, the posterior wall detection unit 46 can detect, as the posterior vascular wall W2, a location where the amount of change in B-mode intensity is maximum, by performing search on the search line parallel to the blood flow perpendicular line NL in the deep portion direction while moving the search line in a direction parallel to the blood flow correction angle line BL in the lower detection region R2.

Further, the anterior vascular wall boundary line and the posterior vascular wall boundary line can be detected using dynamic programming based on an evaluation function including the intensity of the B-mode image signal at each point and the amount of change in intensity of the B-mode image signal at each point. Furthermore, the anterior vascular wall boundary line and the posterior vascular wall boundary line can be detected by using a pattern similarity based on the template indicating a reference pattern of the vascular wall as disclosed in WO2011/099102A1.

The anterior vascular wall boundary line and the posterior vascular wall boundary line can also be detected in a manner that, assuming a plurality of search lines extending parallel to the blood flow perpendicular line NL in the upper detection region R1 and the lower detection region R2, a vascular wall boundary candidate point is decided on each search line, a first evaluation value representing accuracy of the decided vascular wall boundary candidate point as a vascular wall boundary point is calculated using brightness information, particularly intensity information, and edge information, a second evaluation value representing a similarity between the search line including the decided vascular wall boundary candidate point and an adjacent search line is calculated, and a third evaluation value for deciding the vascular wall boundary point from among the vascular wall boundary candidate points is calculated on the basis of the first evaluation value and the second evaluation value, for example, as disclosed in JP5844325B.

Here, as the "second evaluation value", a shift amount in a depth direction between the search lines of the decided vascular wall boundary candidate points can be used instead of the similarity. That is, the anterior vascular wall boundary line and the posterior vascular wall boundary line can be detected by deciding the vascular wall boundary candidate point on each search line, calculating the first evaluation value representing accuracy of the decided vascular wall boundary candidate point as the vascular wall boundary point, calculating the second evaluation value based on the shift amount in the depth direction between the search lines of the decided vascular wall boundary candidate points, and calculating the third evaluation value for deciding the vascular wall boundary point from among the vascular wall boundary candidate points on the basis of the first evaluation value and the second evaluation value.

Next, the operation of the ultrasound diagnostic apparatus according to the third embodiment will be described.

As with the ultrasound diagnostic apparatus 1 of the first embodiment, in Step S1 of the flowchart illustrated in FIG. 9, the B-mode image UB in which at least the blood vessel region BR is imaged is acquired, and is displayed on the display unit 8.

In subsequent Step S2, the cursor steering angle A1 is accepted by the cursor steering angle acceptance unit 19 on the basis of the user's operation, the position of each of the upper gate part G1 and the lower gate part G2 of the Doppler gate DG is accepted by the gate position acceptance unit 21, and the Doppler gate DG is set within the blood vessel region BR on the B-mode image by the gate setting unit 10.

In Step S3, the blood flow correction angle A2 is accepted by the blood flow correction angle acceptance unit 20 on the basis of the user's operation, and the blood vessel gradient A3 is calculated by the blood vessel gradient acquisition unit 11.

Figure 22:
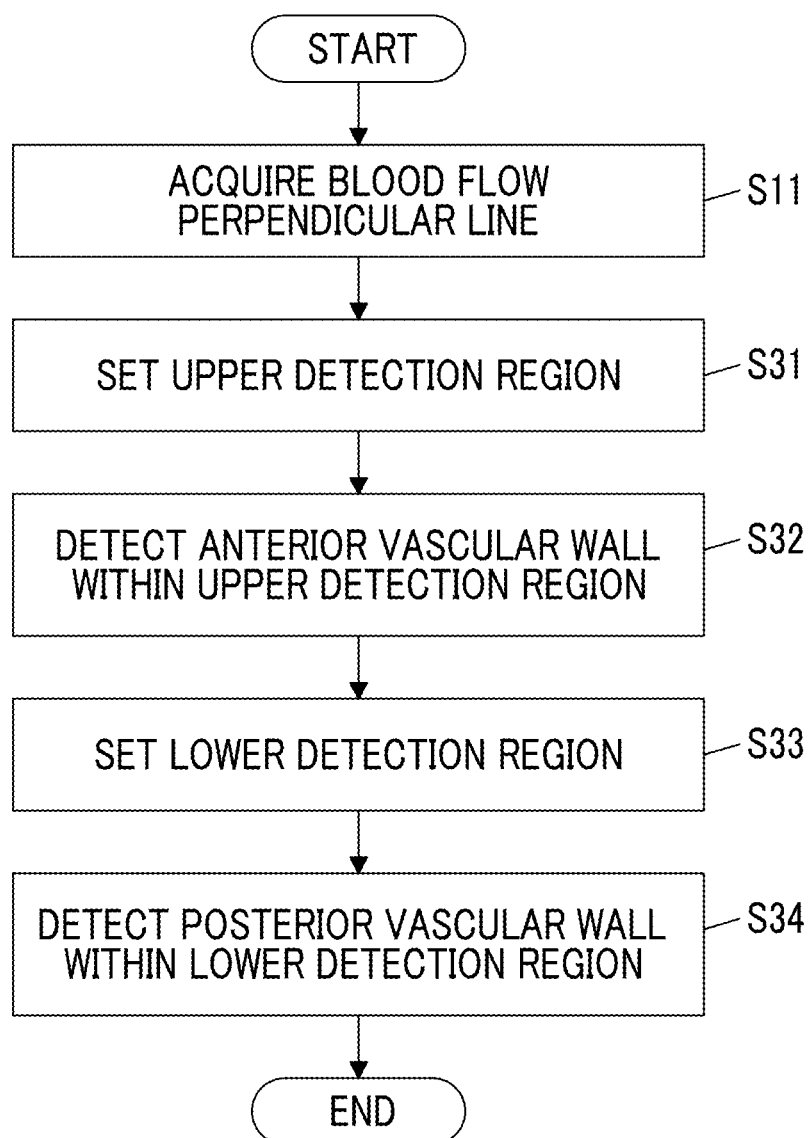
FIG. 22 is a flowchart illustrating a vascular wall detection operation in the third embodiment of the invention.
Figure 23:
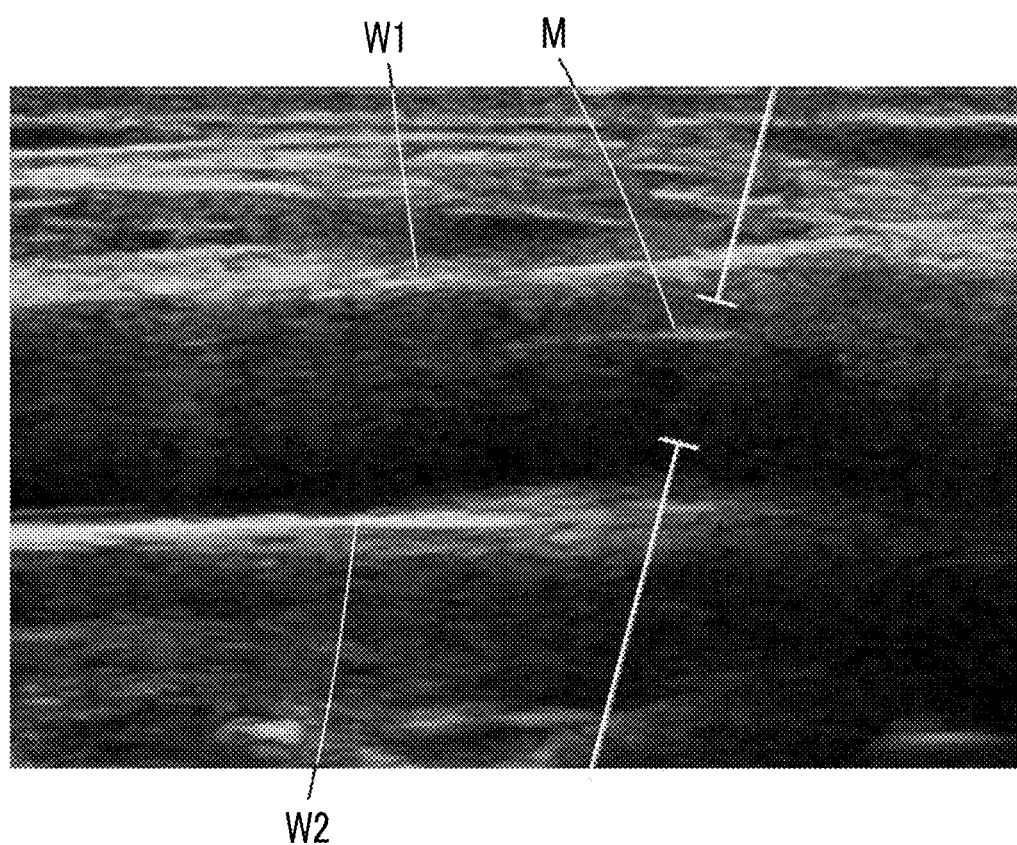
FIG. 23 is a diagram illustrating an example of a B-mode image in which a maximum point of B-mode intensity due to multiple reflection appears.

In subsequent Step S4, the detection of the vascular wall is performed, and the vascular wall detection operation in the vascular wall detection unit 12B of the ultrasound diagnostic apparatus of the third embodiment is illustrated in the flowchart of FIG. 22.

First, in Step S11, the blood flow perpendicular line NL which passes through the center point C of the Doppler gate DG and extends perpendicular to the blood flow correction angle line BL is acquired by the blood flow perpendicular line acquisition unit 35 of the vascular wall detection unit 12B.

The upper detection region R1 is set by the upper detection region setting unit 43 of the vascular wall detection unit 12B using the upper projection point P1 obtained by projecting the upper gate point G1P of the Doppler gate DG on the blood flow perpendicular line NL as a reference in Step S31, and the anterior vascular wall boundary line is detected within the upper detection region R1 and the intersection between the detected anterior vascular wall boundary line and the blood flow perpendicular line NL is detected as the anterior vascular wall W1 by the anterior wall detection unit 45 of the vascular wall detection unit 12B in Step S32.

Similarly, the lower detection region R2 is set by the lower detection region setting unit 44 of the vascular wall detection unit 12B using the lower projection point P3 obtained by projecting the lower gate point G2P of the Doppler gate DG on the blood flow perpendicular line NL as a reference in Step S33, and the posterior vascular wall boundary line is detected within the lower detection region R2 and the intersection between the detected posterior vascular wall boundary line and the blood flow perpendicular line NL is detected as the posterior vascular wall W2 by the posterior wall detection unit 46 of the vascular wall detection unit 12B in Step S34.

In this manner, in a case where the anterior vascular wall W1 and the posterior vascular wall W2 are detected, the cross-sectional area of the blood vessel is calculated by the cross-sectional area calculation unit 13 in Step S5 of the flowchart of FIG. 9, the average blood flow velocity for one heartbeat period is calculated by the average blood flow velocity calculation unit 15 in subsequent Step S6, and the blood flow volume representing the volume of the blood flowing in the blood vessel per unit time is measured in Step S7 by the blood flow volume measurement unit 14 on the basis of the cross-sectional area of the blood vessel calculated by the cross-sectional area calculation unit 13 and the average blood flow velocity calculated by the average blood flow velocity calculation unit 15.

According to the third embodiment, since each of the anterior vascular wall W1 and the posterior vascular wall W2 are detected by not only performing search on the blood flow perpendicular line NL and but also searching the upper detection region R1 and the lower detection region R2, it is possible to improve the detection accuracy of the anterior vascular wall W1 and the posterior vascular wall W2 and to more accurately measure the blood flow volume.

The length H1 and the length L1 of the upper detection region R1 may have the same values as or different values from the length H2 and the length L2 of the lower detection region R2. Further, the length H1 of the upper detection region R1 and the length H2 of the lower detection region R2 along the blood flow perpendicular line NL may have the same values as or different values from the distance D1 and the distance D2 in the first embodiment. Each of the lengths H1 and H2 can be set to have a predetermined ratio with respect to a gate width defined by the distance between the upper gate point G1P and the lower gate point G2P of the Doppler gate DG.

Further, the upper detection region R1 and the lower detection region R2 are not limited to the rectangular shape, and there is no limitation on the shape of the upper detection region R1 and the lower detection region R2.

In the third embodiment, as with the second embodiment, the anterior vascular wall W1 and the posterior vascular wall W2 can be detected by performing the smoothing processing in the horizontal direction on the B-mode image UB1 acquired by rotating the B-mode image UB by the blood vessel gradient A3 and then searching the upper detection region R1 and the lower detection region R2. By doing so, it is possible to more accurately detect the anterior vascular wall W1 and the posterior vascular wall W2 and to measure an accurate blood flow volume.

The ultrasound diagnostic apparatuses according to the above-described first to third embodiments can be applied to a portable ultrasound diagnostic apparatus in which a touch sensor is combined with the display unit 8 and the touch sensor is used as the operation unit 17. Such a portable ultrasound diagnostic apparatus is also effective for outdoor diagnosis in a case of emergency treatment and the like.

EXPLANATION OF REFERENCES

1: ultrasound diagnostic apparatus
2: transducer array
3: transmission unit
4: reception unit
5: B-mode processing unit
6: Doppler processing unit
7: display control unit
8: display unit
9: image generation unit
10: gate setting unit
11, 11A: blood vessel gradient acquisition unit
12, 12A, 12B: vascular wall detection unit
13: cross-sectional area calculation unit
14: blood flow volume measurement unit
15: average blood flow velocity calculation unit
16: device control unit
17: operation unit
18: storage unit
19: cursor steering angle acceptance unit
20: blood flow correction angle acceptance unit
21: gate position acceptance unit
22: ultrasound probe
23: processor 24: amplification unit
25: AD conversion unit
26: beam former
27: signal processing unit
28: DSC
29: image processing unit
30: quadrature detection unit
31: high-pass filter
32: fast Fourier transformer
33: Doppler waveform image generation unit
34: data memory
35: blood flow perpendicular line acquisition unit
36, 45: anterior wall detection unit
37, 46: posterior wall detection unit
38: blood flow correction angle detection unit
39: blood vessel gradient calculation unit
40: image rotation unit
41: smoothing unit
42: coordinate acquisition unit
43: upper detection region setting unit
44: lower detection region setting unit
BR: blood vessel region
SL: scan line
DG: Doppler gate
G1: upper gate part
G1P: upper gate point
G1L, G2L: line segment
G2: lower gate part
G2P: lower gate point
BL: blood flow correction angle line
C: center point
A1: cursor steering angle
A2: blood flow correction angle
A3: blood vessel gradient
SV: vertical line
SH: horizontal line
W1: anterior vascular wall
W2: posterior vascular wall
NL: blood flow perpendicular line
P1: upper projection point
P2, P4: point
P3: lower projection point
D1, D2: distance
UB: B-mode image
UB1: rotated B-mode image
UD: Doppler waveform image
R1: upper detection region
R2: lower detection region
H1, H2, L1, L2: length
M: maximum point

What is claimed is:

1. An ultrasound diagnostic apparatus comprising:
a display; and
a processor configured to
acquire a B mode image in which at least a blood vessel region is imaged;
display the B mode image on the display;
set a Doppler gate within the blood vessel region on the B-mode image;
acquire a blood vessel gradient; and
detect an anterior vascular wall and a posterior vascular wall by performing image analysis on the B-mode image, on an outer side of the Doppler gate in a direction perpendicular to the blood vessel gradient,
wherein the Doppler gate has an upper gate point and a lower gate point which face each other along a scan line passing through a center point of the Doppler gate, and
the processor is further configured to
set an upper projection point by projecting the upper gate point on a blood flow perpendicular line that passes through the center point of the Doppler gate and extends perpendicular to the blood vessel gradient angle;
detect the anterior vascular wall in a range from the upper projection point to a first point positioned in a shallow portion direction apart from the upper projection point by a first predetermined distance along the blood flow perpendicular line;
set a lower projection point by projecting the lower gate point on the blood flow perpendicular line; and
detect the posterior vascular wall in a range from the lower projection point to a second point positioned in a deep portion direction apart from the lower projection point by a second predetermined distance along the blood flow perpendicular line.

2. The ultrasound diagnostic apparatus according to claim 1,
wherein the processor is further configured to
set an upper detection region having a predetermined range which extends in the shallow portion direction from the upper projection point along the blood flow perpendicular line and extends parallel to the blood vessel gradient, detect an anterior vascular wall boundary line within the upper detection region, and detect an intersection between the blood flow perpendicular line and the detected anterior vascular wall boundary line as the anterior vascular wall, and
set a lower detection region having a predetermined range which extends in the deep portion direction from the lower projection point along the blood flow perpendicular line and extend parallel to the blood vessel gradient, detect a posterior vascular wall boundary line within the lower detection region, and detect an intersection between the blood flow perpendicular line and the detected posterior vascular wall boundary line as the posterior vascular wall.

3. The ultrasound diagnostic apparatus according to claim 2,
wherein the processor is further configured to
rotate the B-mode image by the blood vessel gradient such that the blood vessel region extends horizontally, and
respectively detect the anterior vascular wall and the posterior vascular wall on the rotated B-mode image.

4. The ultrasound diagnostic apparatus according to claim 3,
wherein the processor is further configured to
perform smoothing processing along a horizontal direction on the rotated B-mode image and
respectively detect the anterior vascular wall and the posterior vascular wall on the smoothed B-mode image.

5. The ultrasound diagnostic apparatus according to claim 2,
wherein the processor is further configured to calculate a cross-sectional area of a blood vessel on the basis of the anterior vascular wall and the posterior vascular wall.

6. The ultrasound diagnostic apparatus according to claim 1,
wherein the processor is further configured to
rotate the B-mode image by the blood vessel gradient such that the blood vessel region extends horizontally, and respectively detect the anterior vascular wall and the posterior vascular wall on the rotated B-mode image.

7. The ultrasound diagnostic apparatus according to claim 6,
wherein the processor is further configured to
perform smoothing processing along a horizontal direction on the rotated B-mode image and
respectively detect the anterior vascular wall and the posterior vascular wall on the smoothed B-mode image.

8. The ultrasound diagnostic apparatus according to claim 1,
wherein the processor is further configured to calculate a cross-sectional area of a blood vessel on the basis of the anterior vascular wall and the posterior vascular wall.

9. The ultrasound diagnostic apparatus according to claim 8,
wherein the processor is further configured to
calculate a blood flow velocity on the basis of Doppler data in the Doppler gate;
measure a blood flow volume on the basis of the cross-sectional area of the blood vessel and the blood flow velocity; and
display a measurement result on the display.

10. The ultrasound diagnostic apparatus according to claim 9,
wherein the processor is further configured to
calculate an average blood flow velocity for one heartbeat period on the basis of the blood flow velocity; and
measure a blood flow volume on the basis of the cross-sectional area of the blood vessel and the average blood flow velocity.

11. The ultrasound diagnostic apparatus according to claim 9,
wherein the processor is further configured to
generate a Doppler waveform image on the basis of the Doppler data in the Doppler gate; and
display the B-mode image and the Doppler waveform image on the display.

12. The ultrasound diagnostic apparatus according to claim 1,
wherein the processor is further configured to acquire the blood vessel gradient on the basis of a cursor steering angle which is an inclination angle of a scan line passing through a center point of the Doppler gate, and a blood flow correction angle which represents an inclination angle of the blood vessel region with respect to the scan line passing through the center point of the Doppler gate.

13. The ultrasound diagnostic apparatus according to claim 1,
wherein the processor is further configured to
recognize the blood vessel region to detect a blood flow correction angle by performing image analysis on the B-mode image; and
calculate the blood vessel gradient using the blood flow correction angle.

14. The ultrasound diagnostic apparatus according to claim 1,
wherein the first predetermined distance and the second predetermined distance have an identical value with each other.

15. The ultrasound diagnostic apparatus according to claim 1,
wherein the first predetermined distance and the second predetermined distance have different values from each other.

16. The ultrasound diagnostic apparatus according to claim 1,
wherein each of the first predetermined distance and the second predetermined distance is set to have a predetermined ratio with respect to a distance between the upper gate point and the lower gate point.

17. A control method of an ultrasound diagnostic apparatus, the control method comprising:
displaying a B-mode image in which at least a blood vessel region is imaged;
setting a Doppler gate within the blood vessel region on the B-mode image;
acquiring a blood vessel gradient; and
detecting an anterior vascular wall and a posterior vascular wall by performing image analysis on the B-mode image, on an outer side of the Doppler gate in a direction perpendicular to the acquired blood vessel gradient,
wherein the Doppler gate has an upper gate point and a lower gate point which face each other along a scan line passing through a center point of the Doppler gate,
setting an upper projection point by projecting the upper gate point on a blood flow perpendicular line that passes through the center point of the Doppler gate and extends perpendicular to the blood vessel gradient angle;
detecting the anterior vascular wall in a range from the upper projection point to a first point positioned in a shallow portion direction apart from the upper projection point by a first predetermined distance along the blood flow perpendicular line;
setting a lower projection point by projecting the lower gate point on the blood flow perpendicular line; and
detecting the posterior vascular wall only in a range from the lower projection point to a second point positioned in a deep portion direction apart from the lower projection point by a second predetermined distance along the blood flow perpendicular line.

* * * * *